(12) United States Patent
Lee

(10) Patent No.: US 12,458,369 B2
(45) Date of Patent: Nov. 4, 2025

(54) DEVICE AND METHOD FOR AUTOLOGOUS BONE GRAFT HARVESTING

(71) Applicants: Kah Hung Benjamino Lee, Hong Kong (CN); Brian Phillip Kelly, Phoenix, AZ (US)

(72) Inventor: Kah Hung Benjamino Lee, Hong Kong (CN)

(73) Assignees: Kah Hung Benjamino Lee, Hong Kong (CN); Brian Phillip Kelly, Phoenix, AZ (US)

( * ) Notice: Subject to any disclaimer, the term of this patent is extended or adjusted under 35 U.S.C. 154(b) by 307 days.

(21) Appl. No.: 18/026,129

(22) PCT Filed: Sep. 11, 2021

(86) PCT No.: PCT/IB2021/058275
§ 371 (c)(1),
(2) Date: Mar. 14, 2023

(87) PCT Pub. No.: WO2022/058860
PCT Pub. Date: Mar. 24, 2022

(65) Prior Publication Data
US 2023/0363770 A1    Nov. 16, 2023

(30) Foreign Application Priority Data

Sep. 17, 2020 (HK) .......................... 22020016443.6

(51) Int. Cl.
*A61B 17/16*    (2006.01)
*A61B 17/14*    (2006.01)
*A61B 90/00*    (2016.01)

(52) U.S. Cl.
CPC .......... *A61B 17/1635* (2013.01); *A61B 17/14* (2013.01); *A61B 17/1617* (2013.01);
(Continued)

(58) Field of Classification Search
CPC ............ A61B 17/1617; A61B 17/1635; A61B 17/1637
See application file for complete search history.

(56) References Cited

U.S. PATENT DOCUMENTS

| 493,730   | A | * | 3/1893 | MacKenzie | ...... A61B 17/32053 606/179 |
| 4,941,466 | A | * | 7/1990 | Romano    | ............ A61B 17/1642 408/127 |

(Continued)

FOREIGN PATENT DOCUMENTS

| CN | 203852396 U | 10/2014 |
| CN | 205054338 U | 3/2016 |

(Continued)

*Primary Examiner* — Matthew J Lawson

(57) ABSTRACT

A device(100) and method(4100) for autologous bone graft harvesting simultaneously cuts a cross-section of a bone (900) longitudinally with a longitudinal drill assembly(102), and transversely with a saw assembly(126) during a bone (900) drilling to obtain a bone block for repairing and rebuilding diseased bones. The longitudinal drill assembly (102) and the saw assembly(126) simultaneously cut a cross-section of a bone(900). The device(100) is hand-controllable, drill motor powered, and spring-tensioned to selectively cut internally to the captured bone for internal bone harvesting. The longitudinal drill assembly(102) includes a drill shaft(114) extending perpendicular from a drill plate(112), having a flat surface(204) with a depth gauge(116). A module assembly(118) includes a module plate(120) disposed above the drill plate(112). Pins(302a, 302b) extend from the upper face(308a) of the module plate(120) to engage ends of slots(400a,400b) to restrict over-rotation of saw plate(128). The saws (136a,136b) move between an open position(700a) for stowage, and a closed position(700b) while sawing the bone(900).

14 Claims, 46 Drawing Sheets

(52) U.S. Cl.
CPC .... *A61B 17/1637* (2013.01); *A61B 2090/062* (2016.02); *A61B 2090/0811* (2016.02)

(56) References Cited

U.S. PATENT DOCUMENTS

| | | | |
|---|---|---|---|
| 2004/0210229 A1* | 10/2004 | Meller | A61B 10/025 |
| | | | 606/80 |
| 2004/0215102 A1* | 10/2004 | Ikehara | A61B 10/0096 |
| | | | 600/562 |
| 2012/0191096 A1* | 7/2012 | Lee | A61C 8/0089 |
| | | | 606/80 |
| 2014/0081270 A1* | 3/2014 | Klotz | A61B 17/1637 |
| | | | 606/80 |
| 2017/0143351 A1 | 5/2017 | Devitre et al. | |
| 2019/0167276 A1* | 6/2019 | Dong | A61B 17/1637 |
| 2020/0121328 A1* | 4/2020 | Lee | A61B 17/1637 |
| 2022/0304672 A1* | 9/2022 | Kalhorn | A61B 17/86 |

FOREIGN PATENT DOCUMENTS

| | | |
|---|---|---|
| CN | 109512482 A | 3/2019 |
| CN | 110799133 A | 2/2020 |
| GB | 2483089 A | 2/2012 |

\* cited by examiner

[Fig. 1]
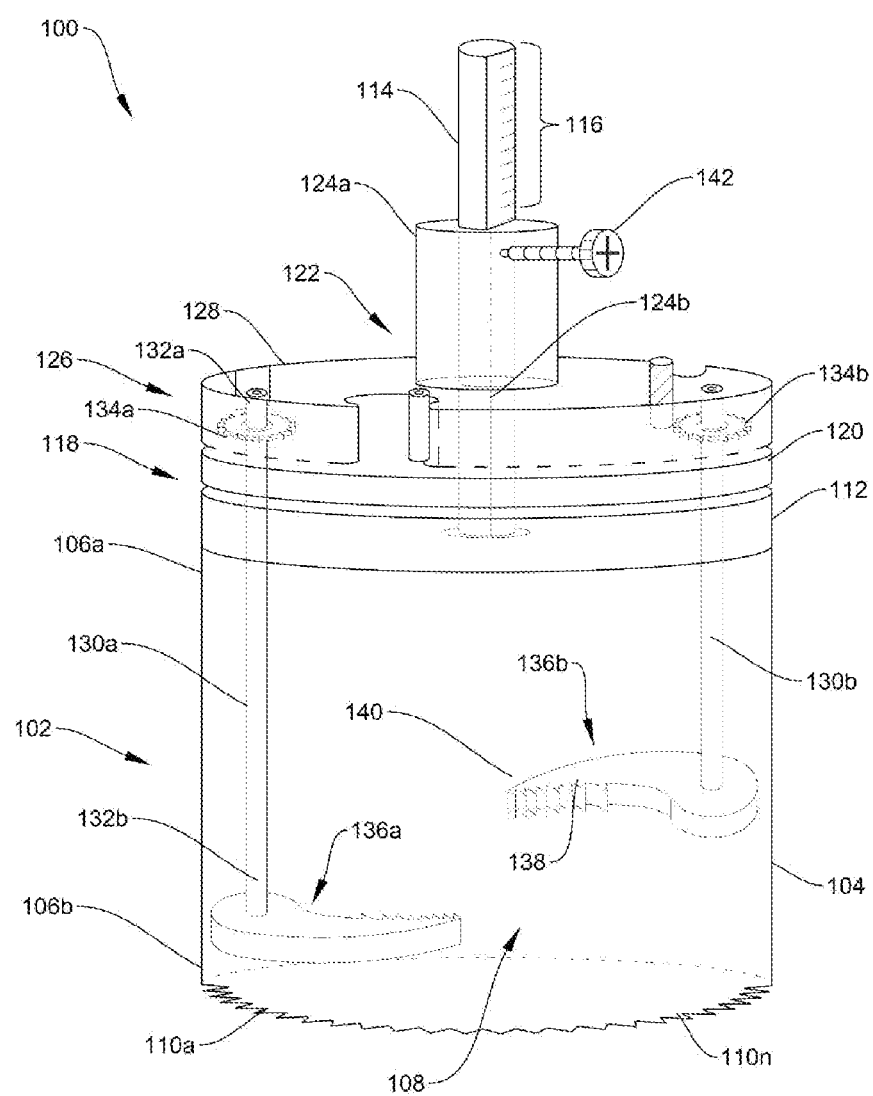

[Fig. 2A]
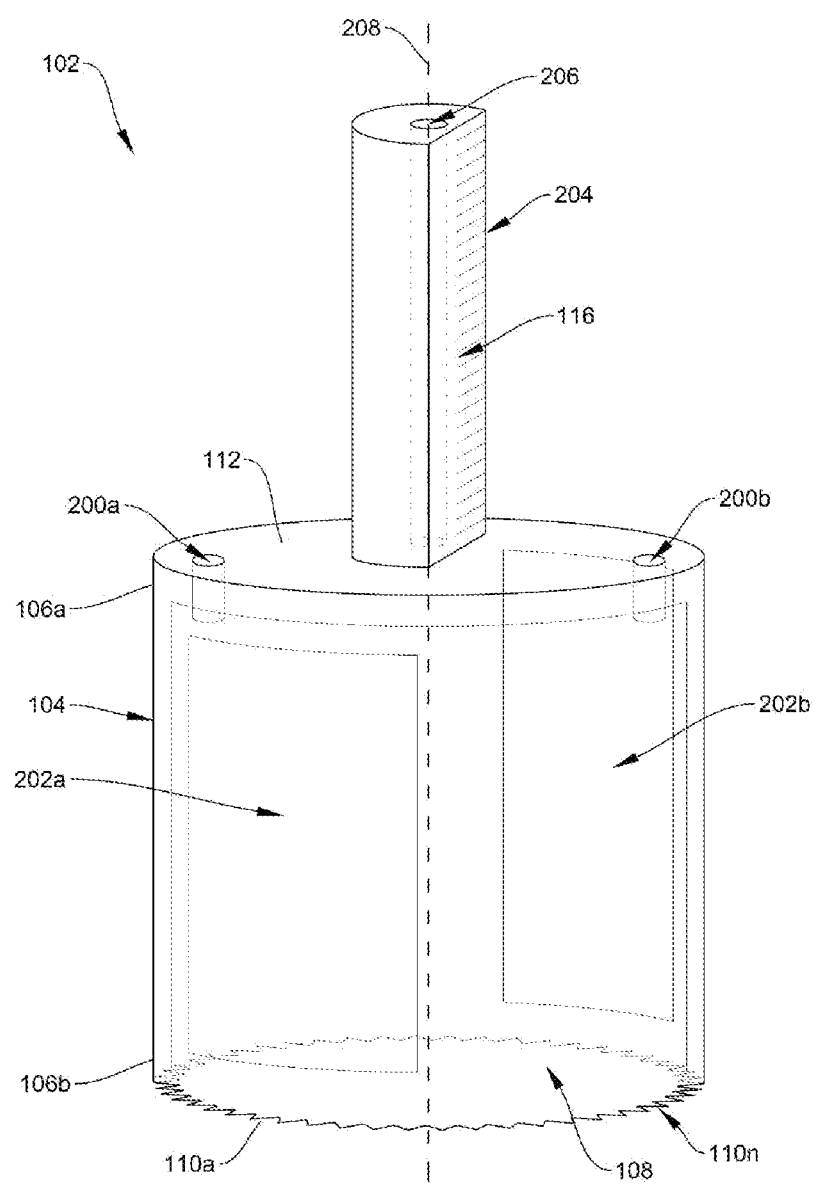

[Fig. 2B]
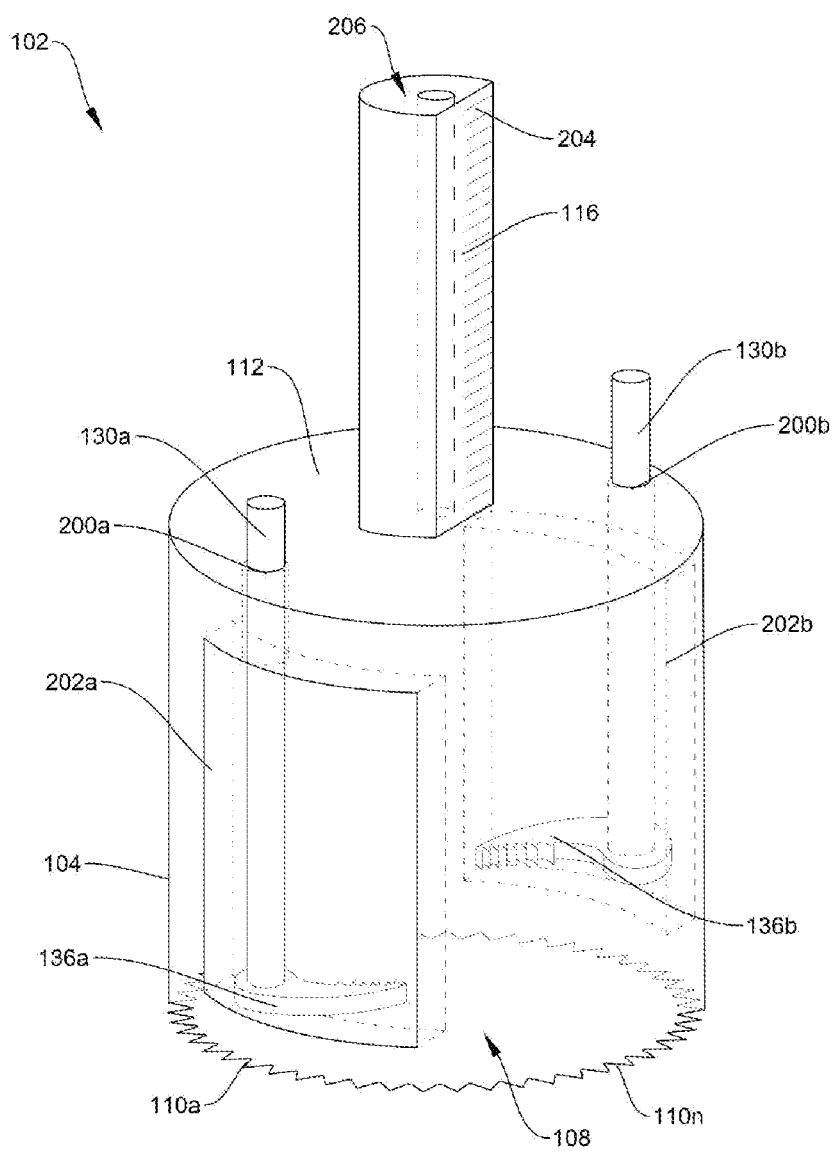

[Fig. 3]
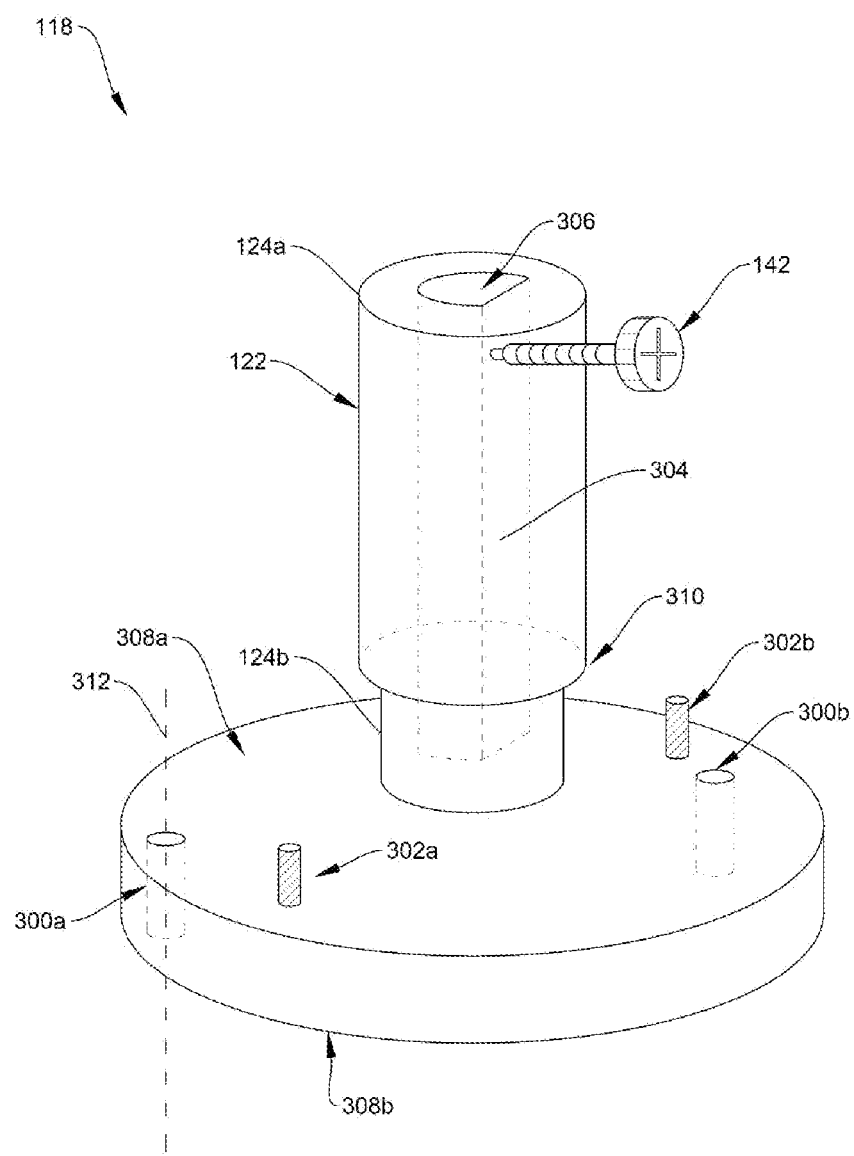

[Fig. 4]
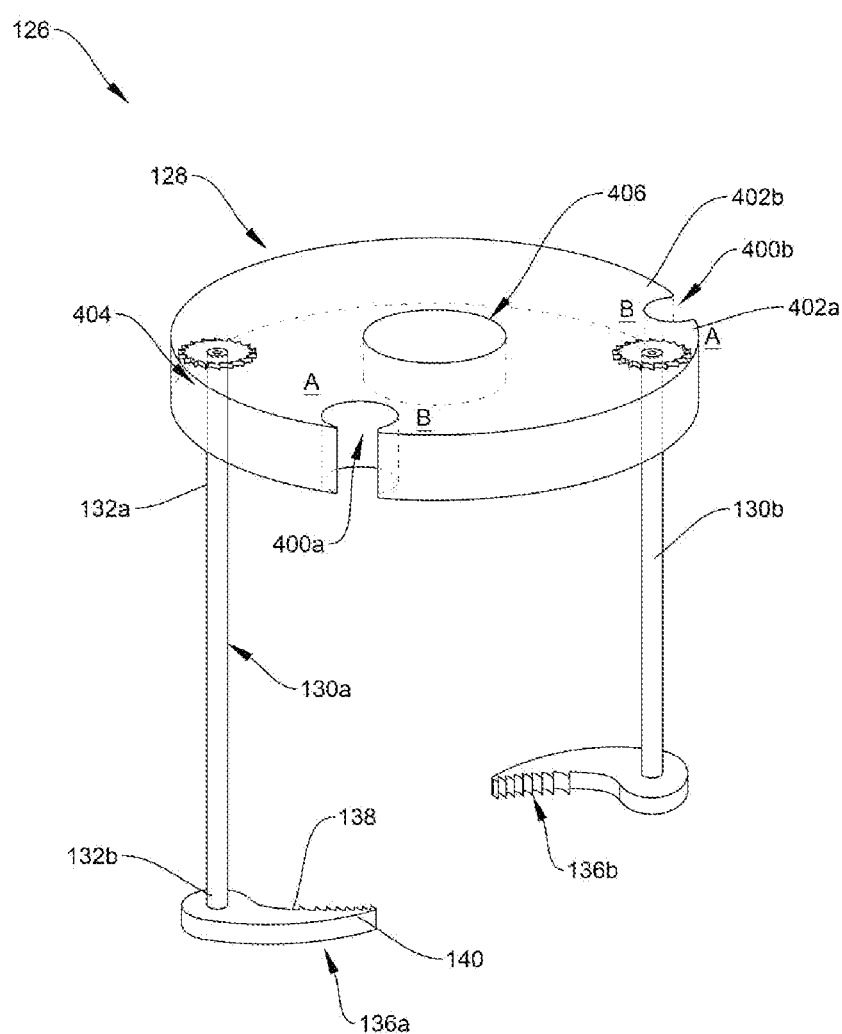

[Fig. 5]
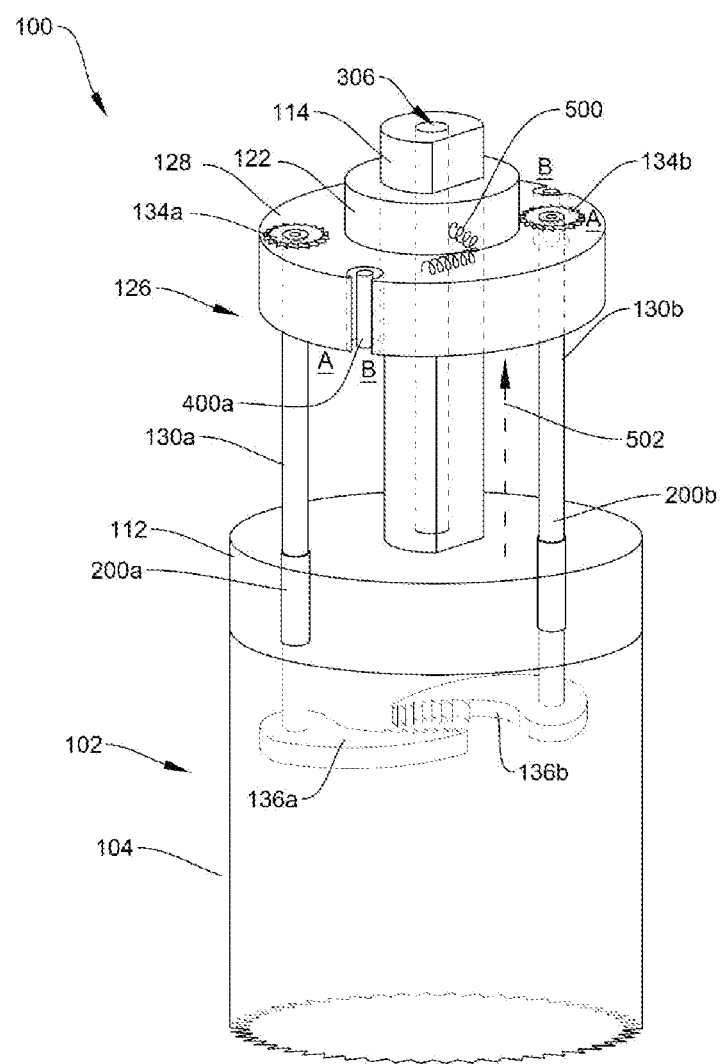

[Fig. 6]
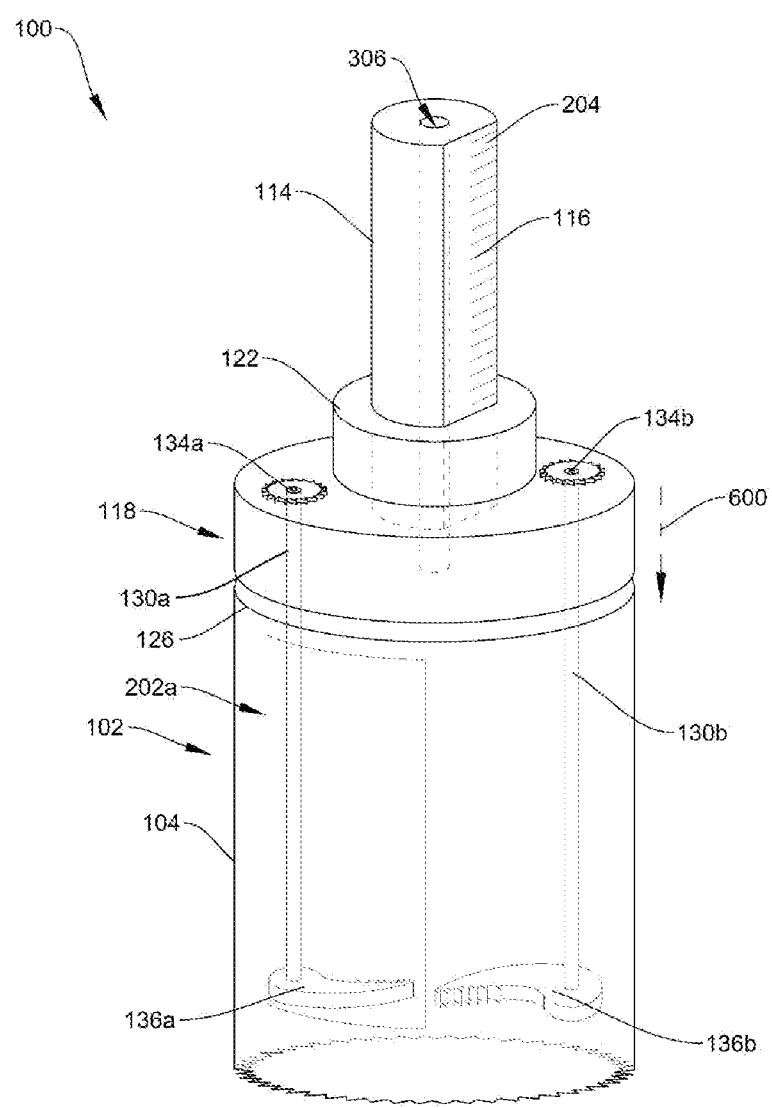

[Fig. 7A]
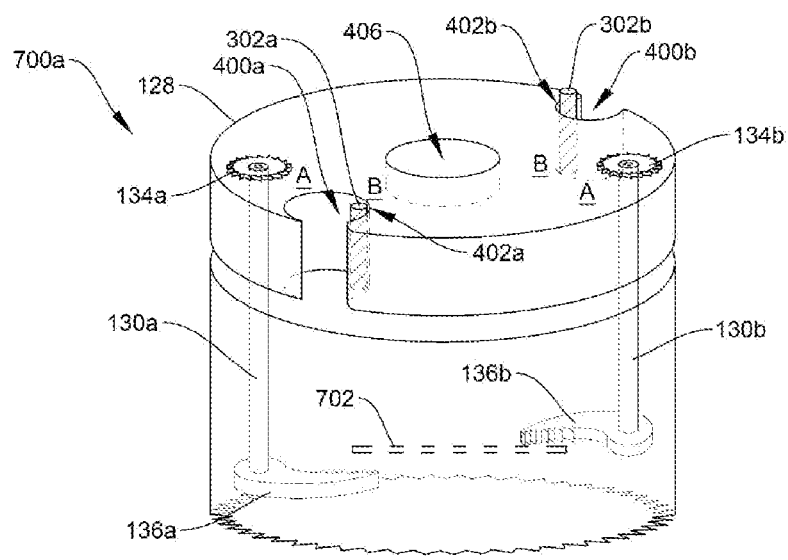
[Fig. 7B]
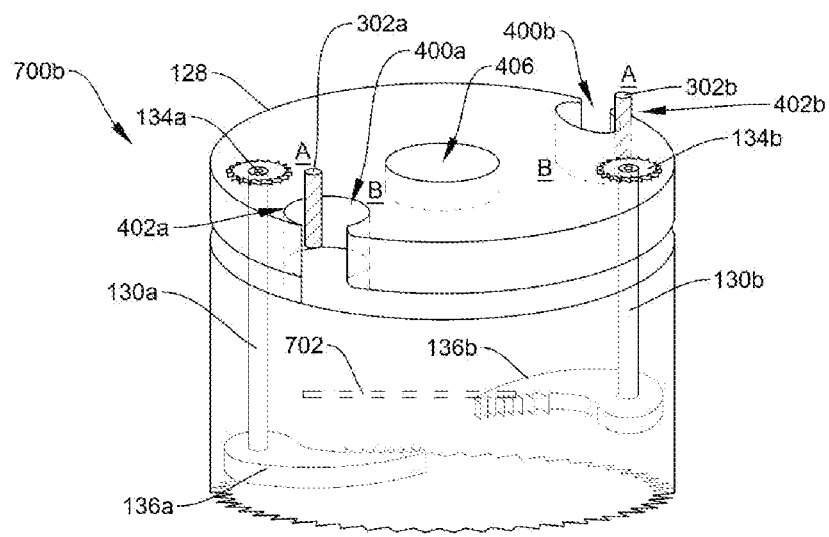

[Fig. 8A]
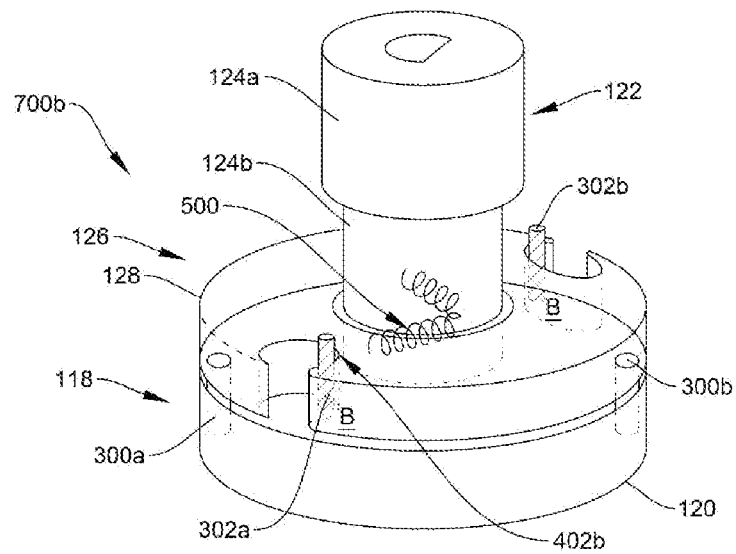
[Fig. 8B]
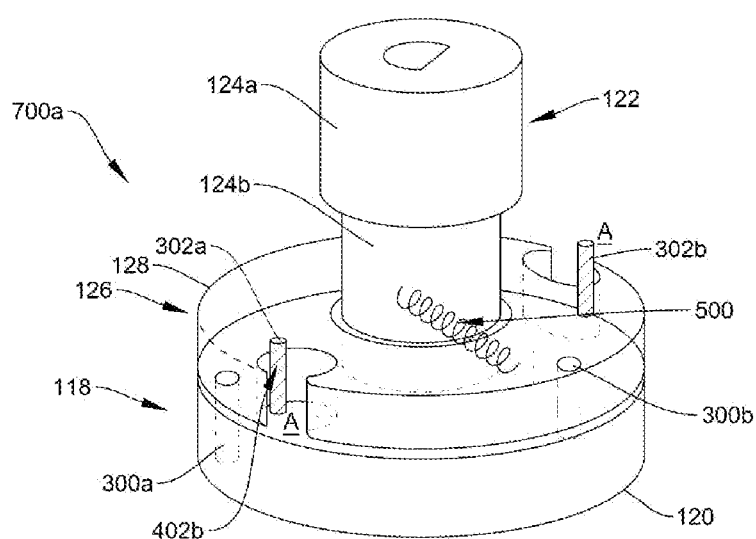

[Fig. 9]
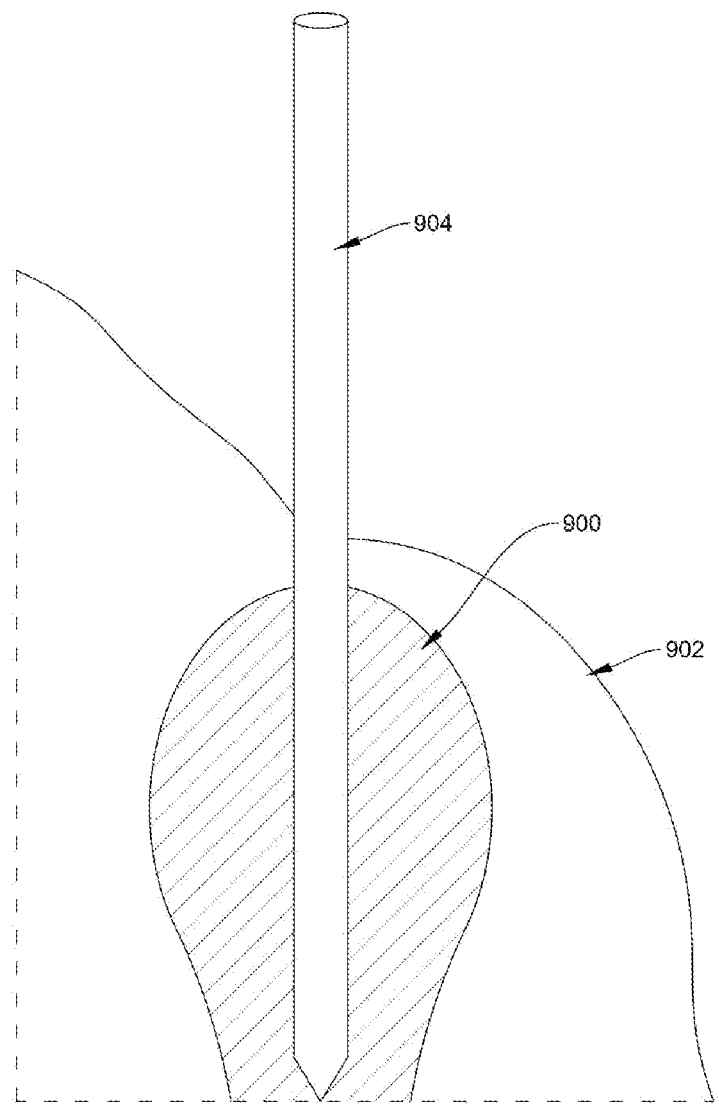

[Fig. 10]
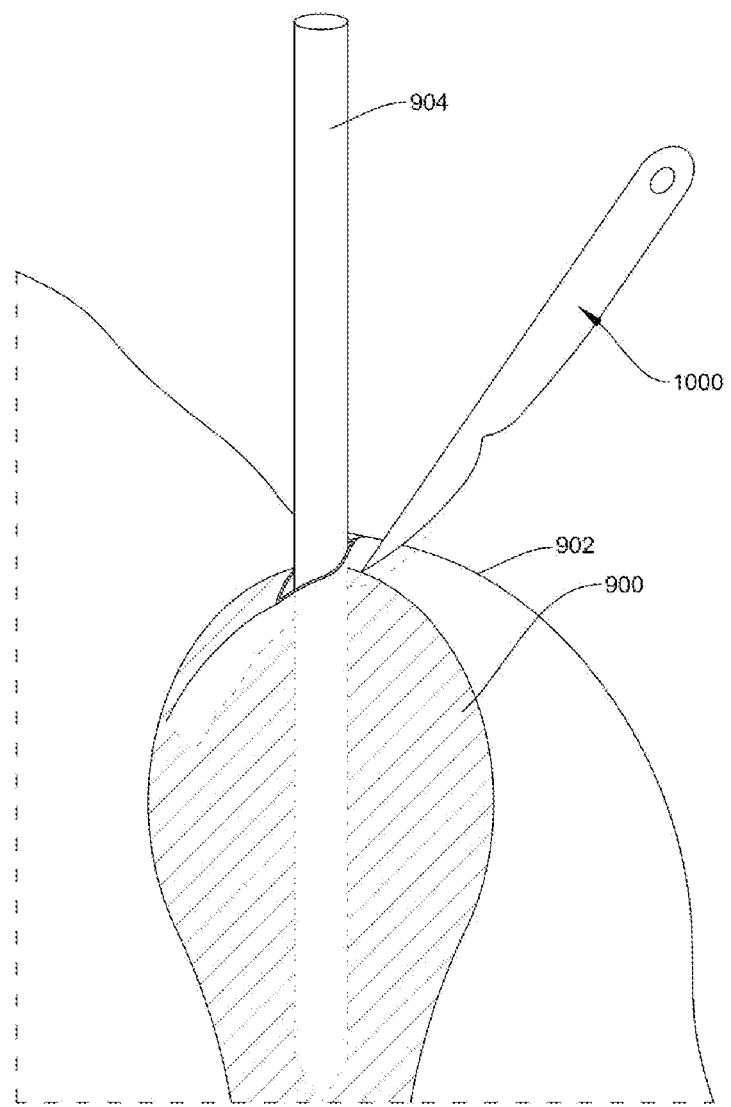

[Fig. 11]
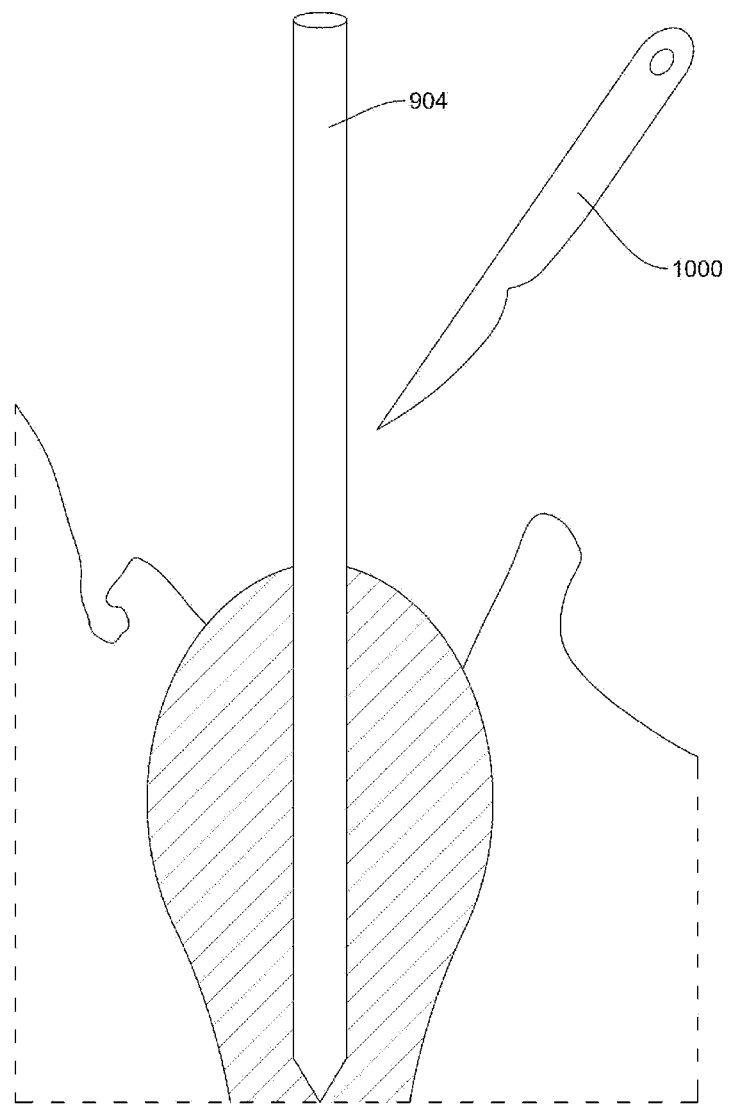

[Fig. 12]
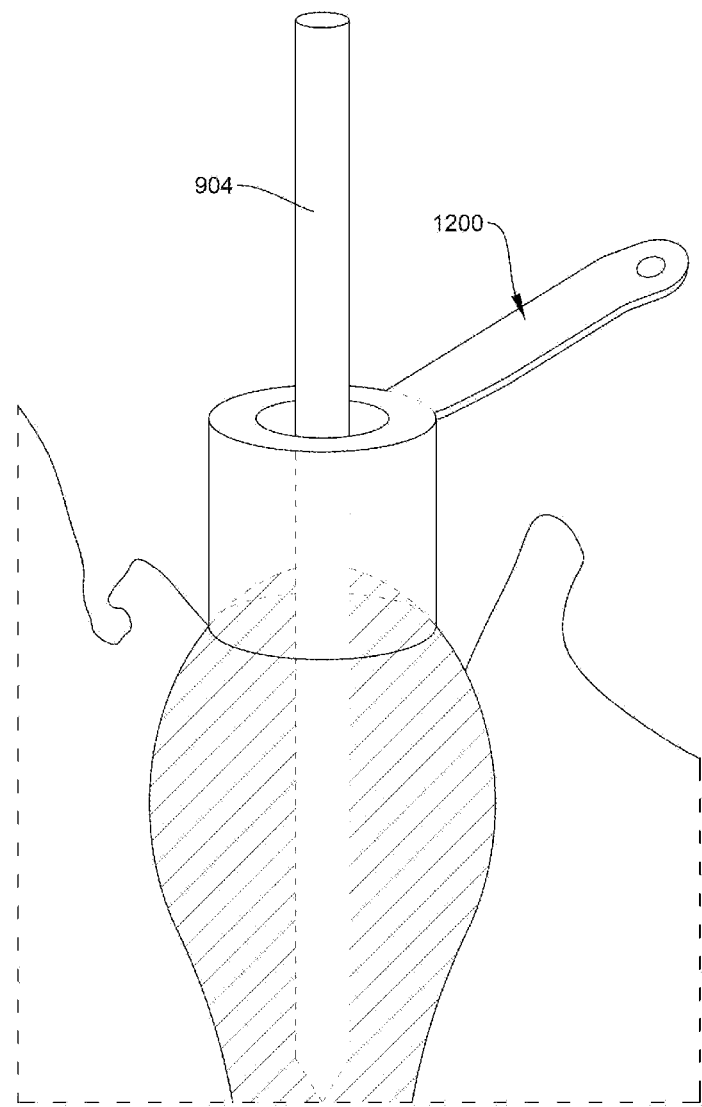

[Fig. 13]
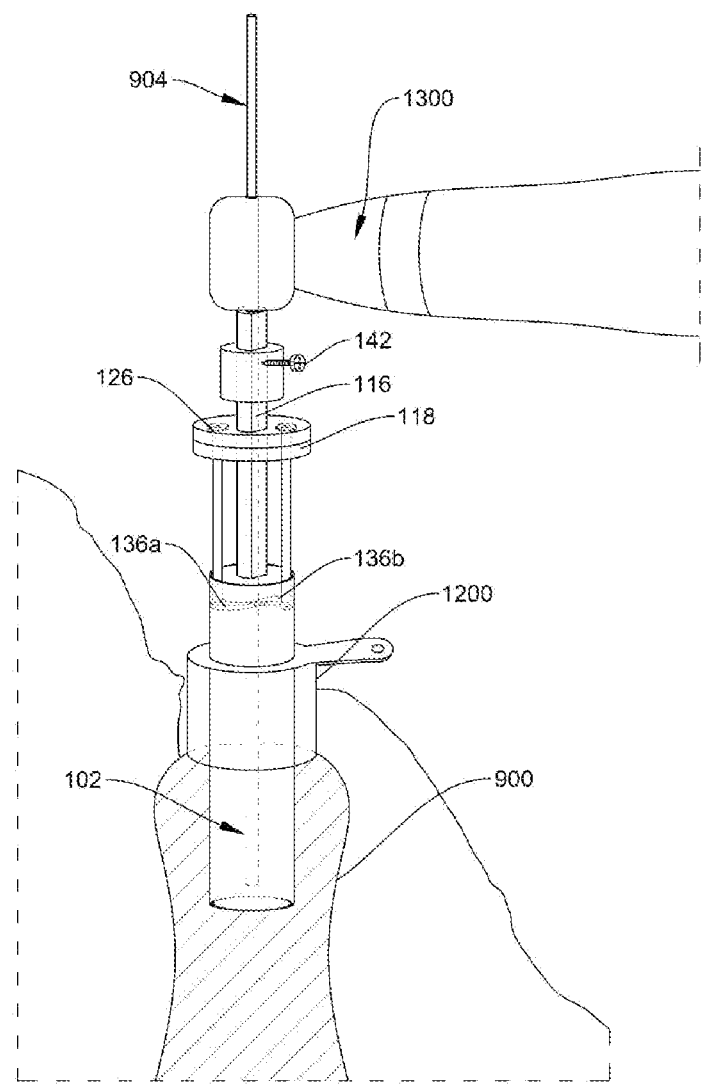

[Fig. 14]
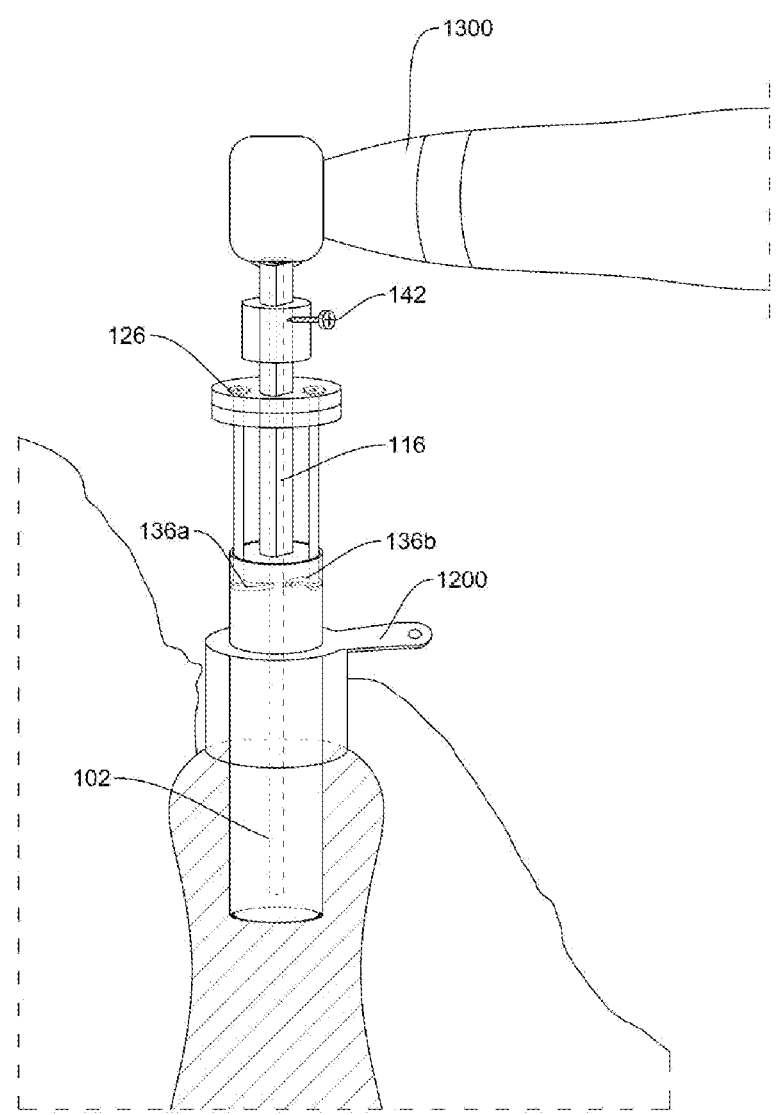

[Fig. 15]
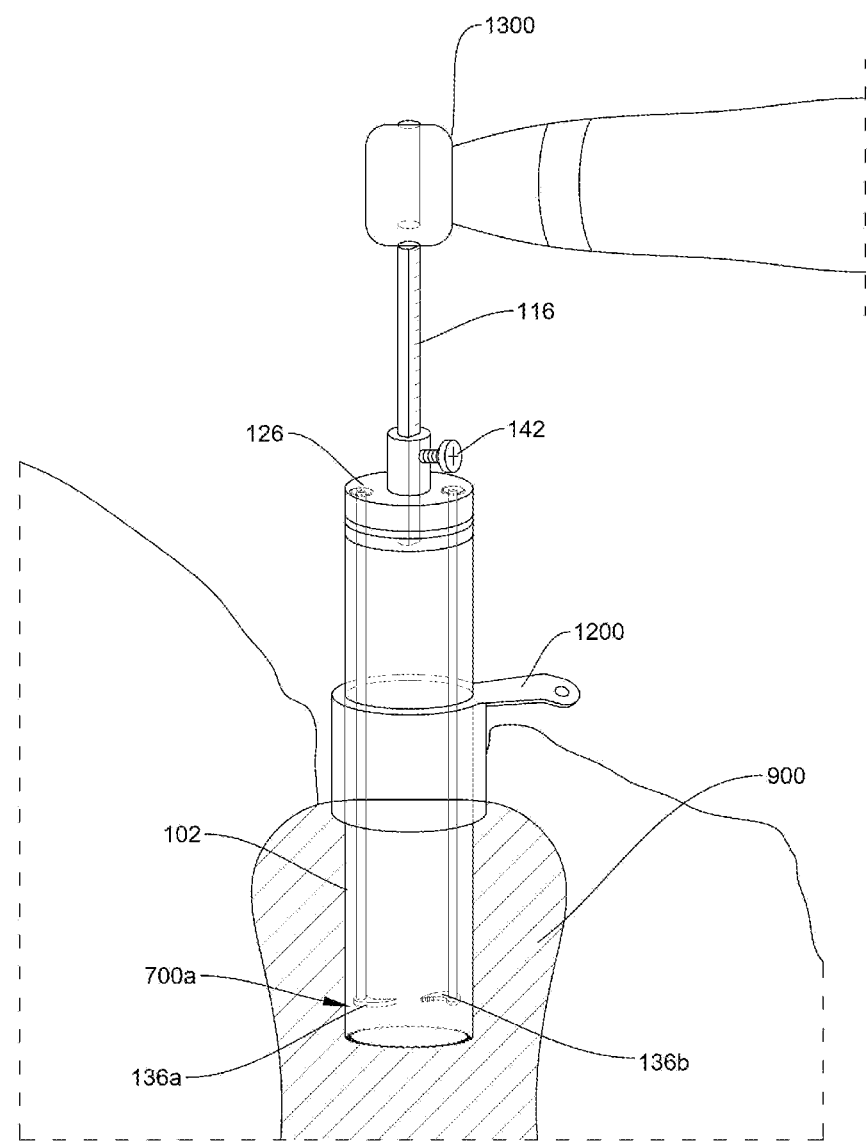

[Fig. 16]
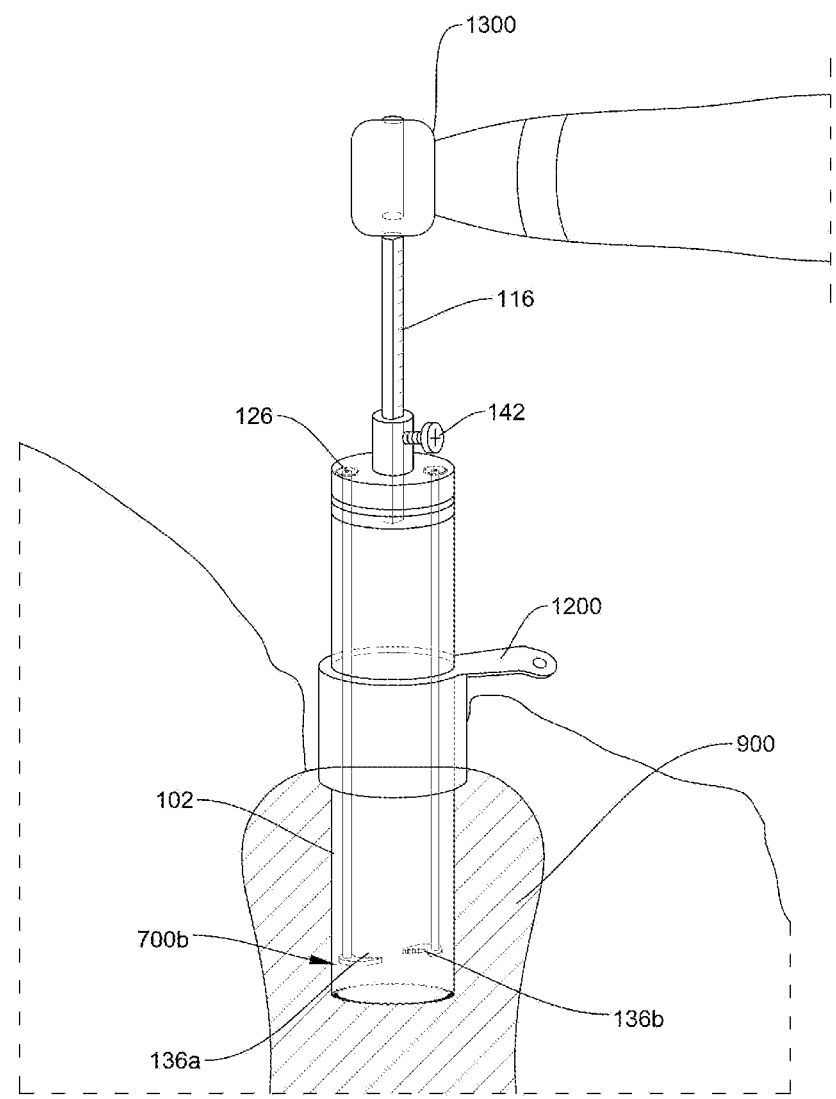

[Fig. 17]
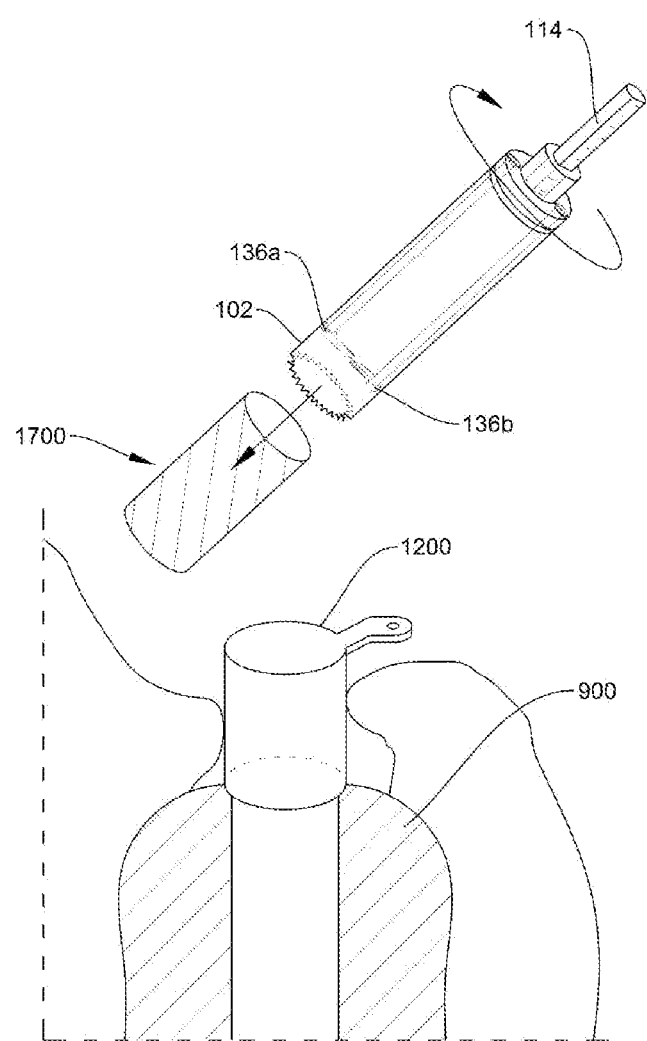

[Fig. 18]
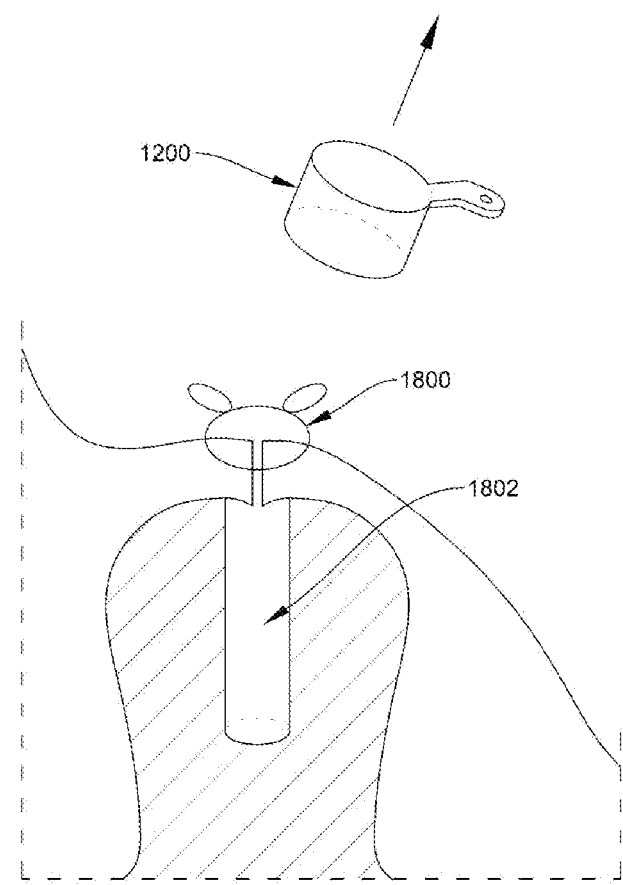

[Fig. 19A]
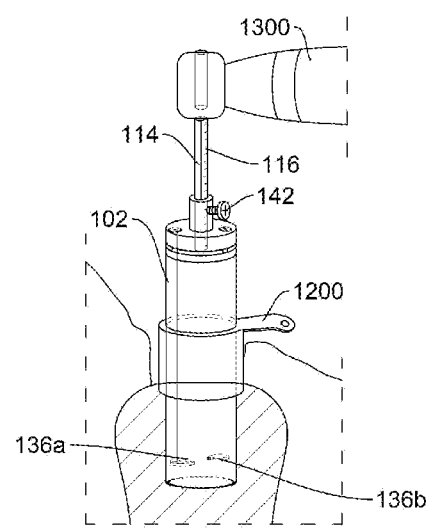
[Fig. 19B]
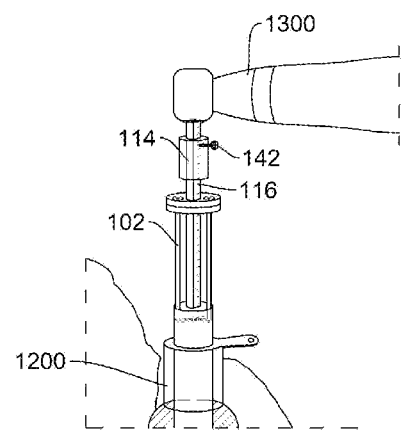

[Fig. 19C]
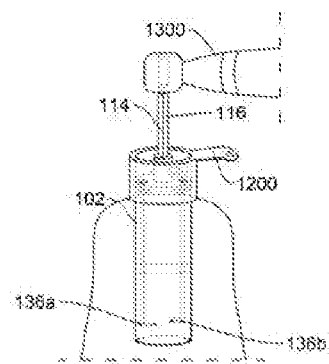
[Fig. 20A]
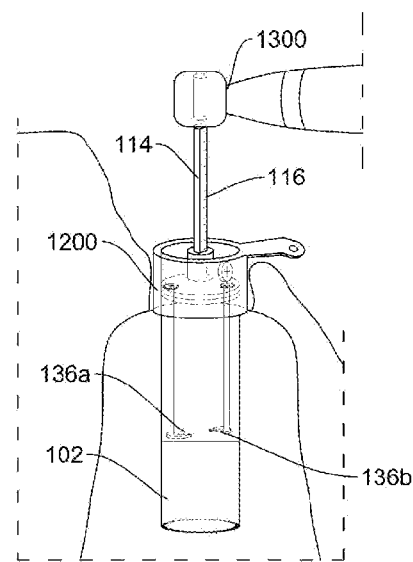

[Fig. 20B]
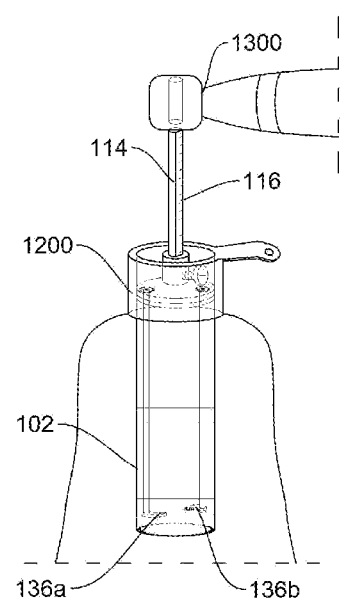

[Fig. 21]
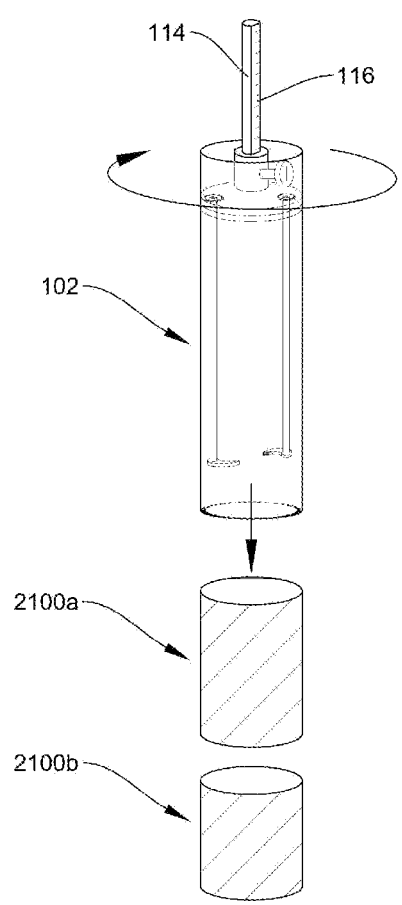

[Fig. 22]
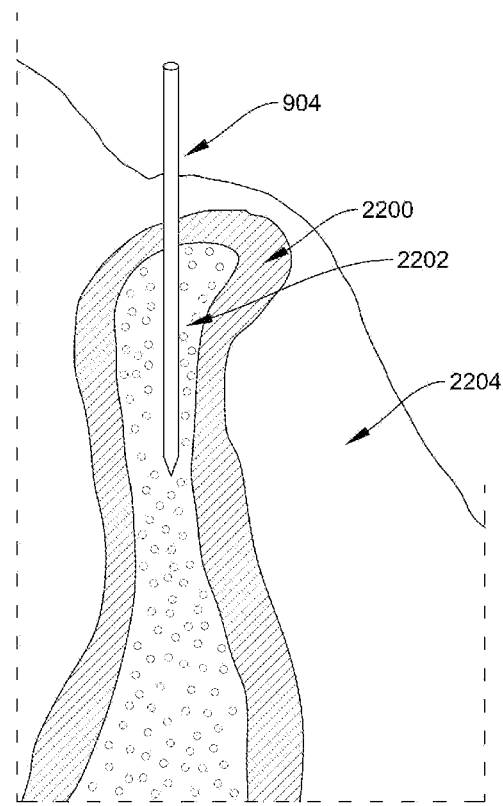

[Fig. 23]
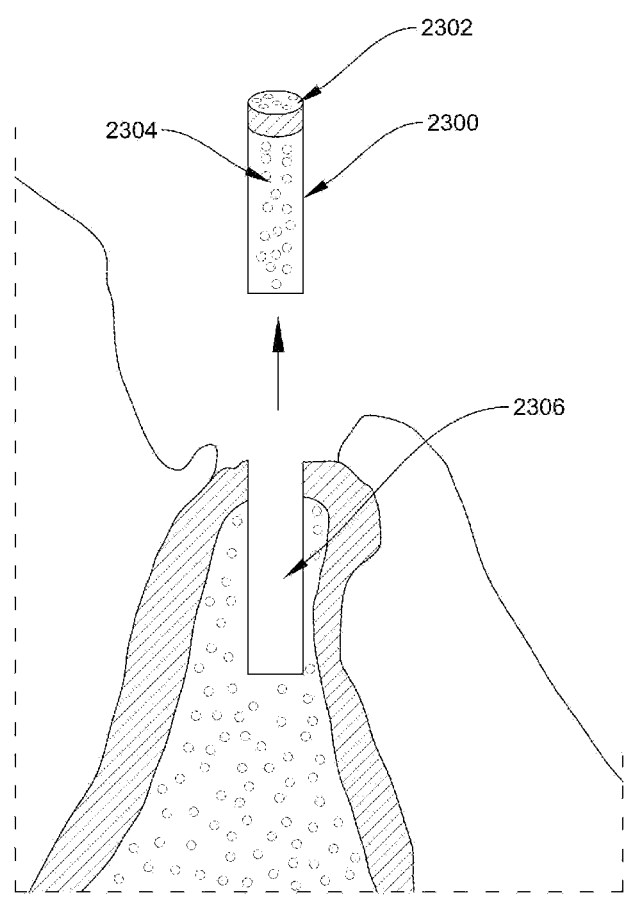

[Fig. 24]
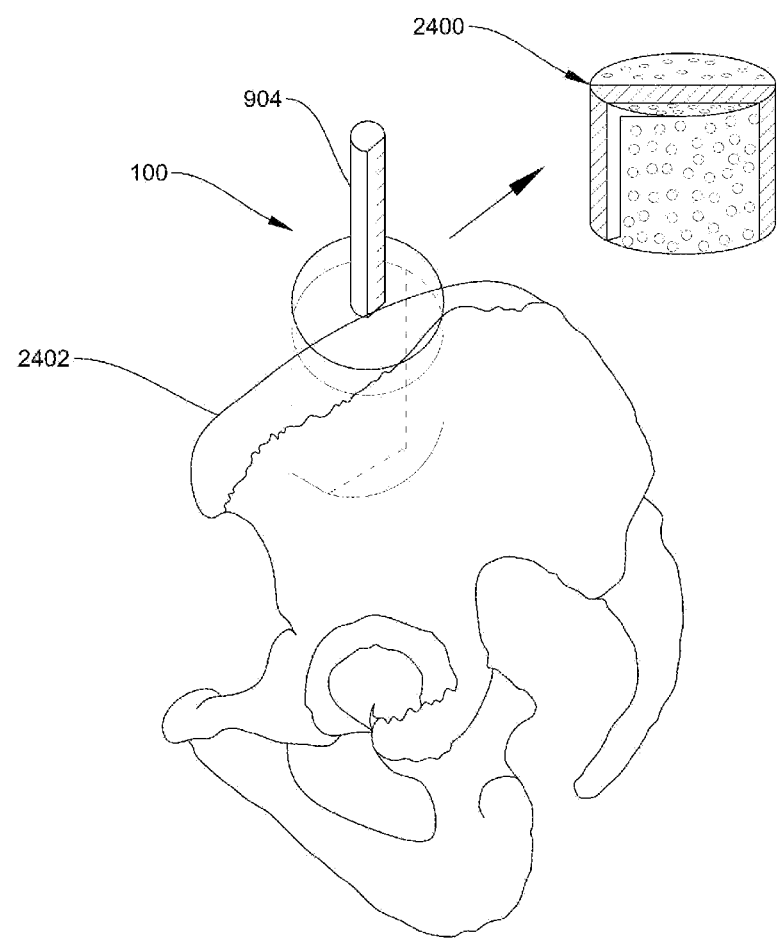

[Fig. 25]
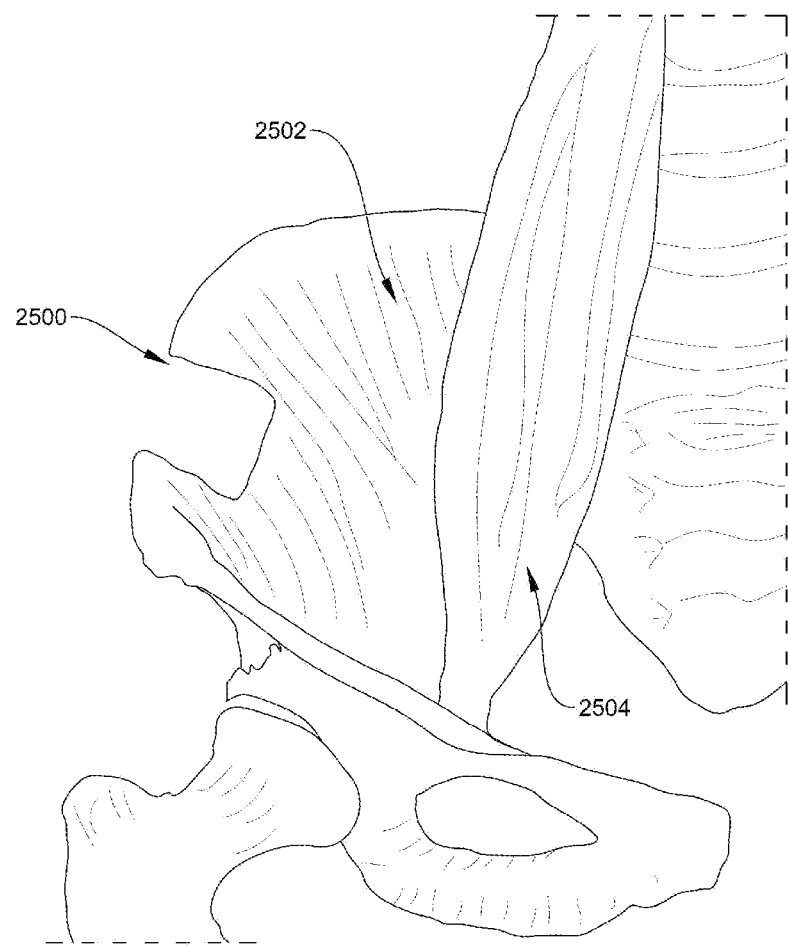

[Fig. 26A]
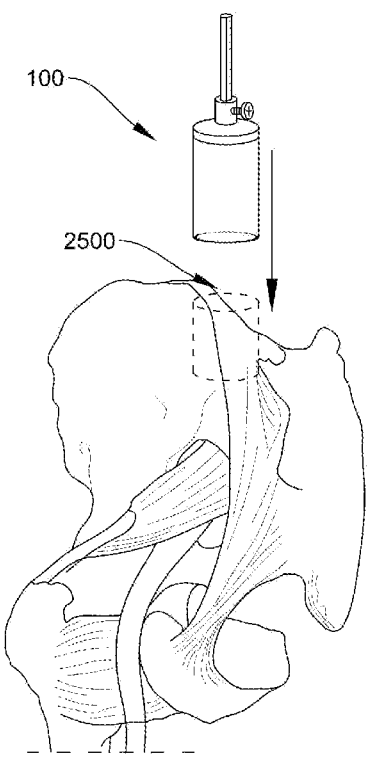

[Fig. 26B]
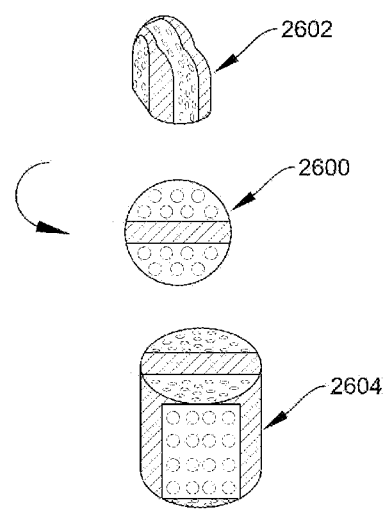

[Fig. 27]
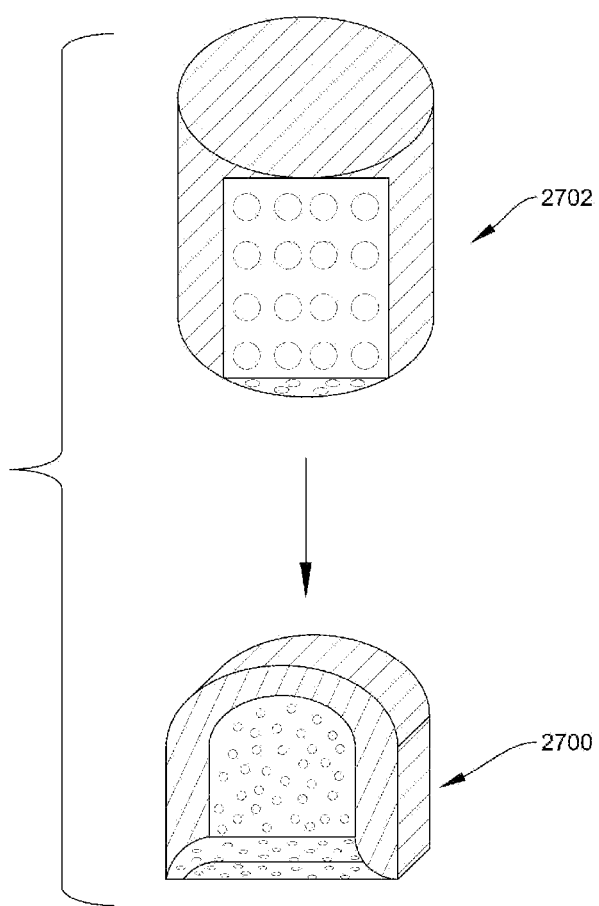

[Fig. 28A]
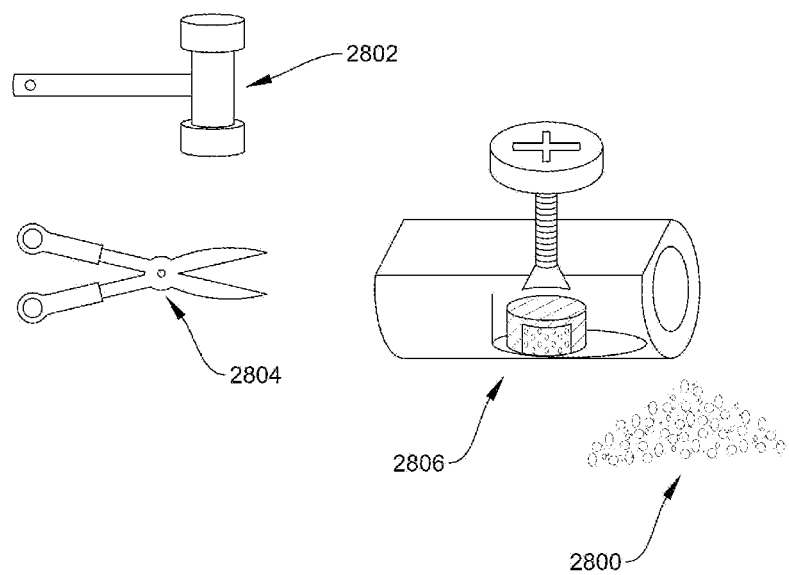
[Fig. 28B]
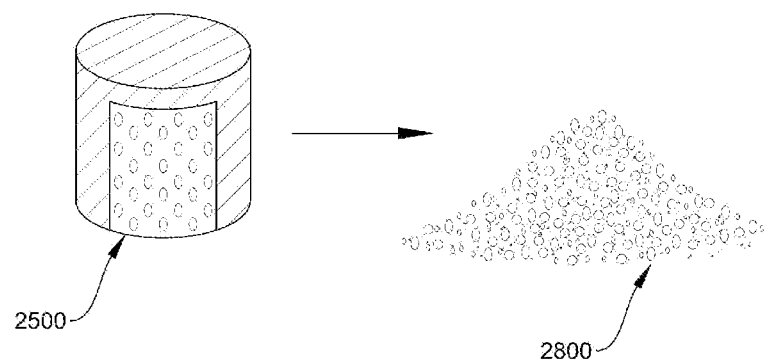

[Fig. 29]
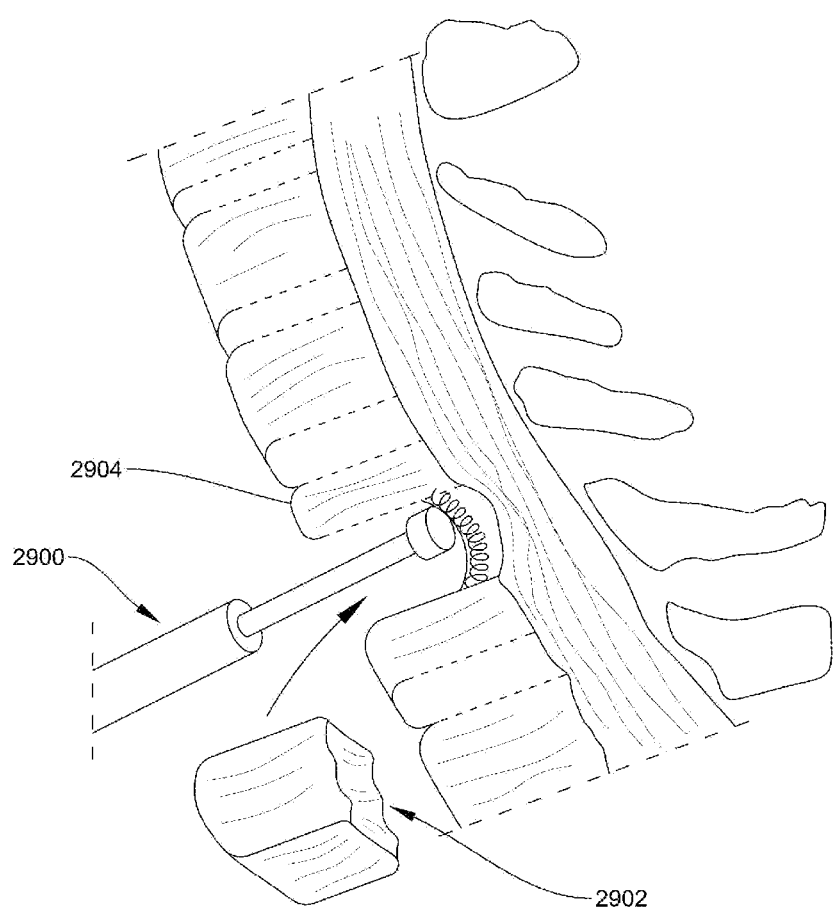

[Fig. 30]
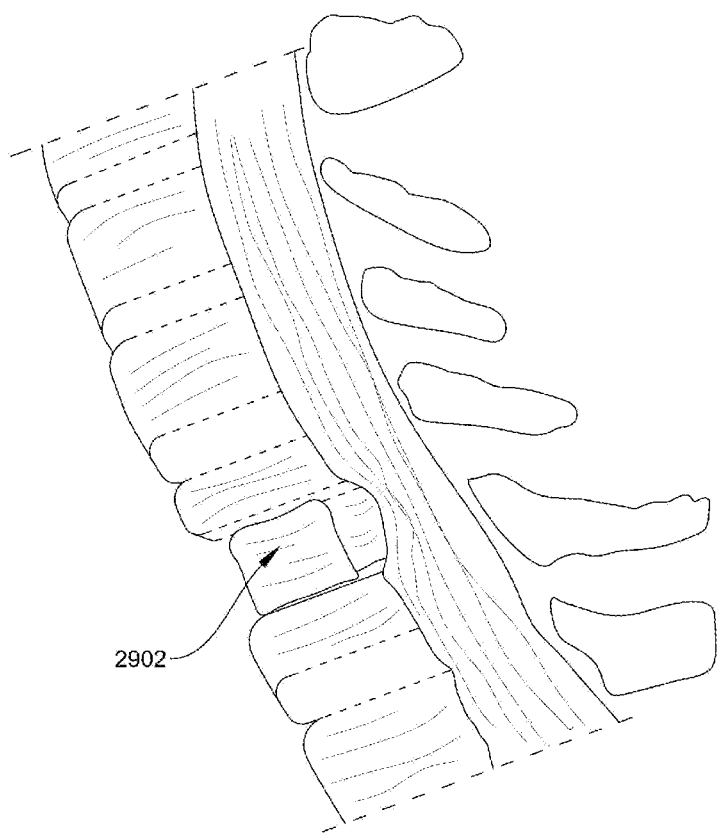

[Fig. 31A]
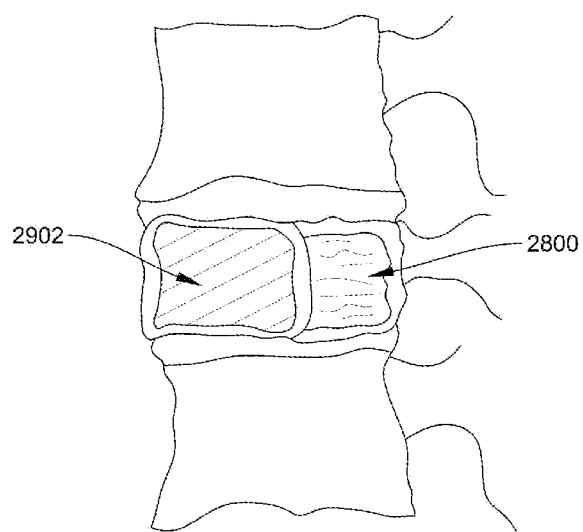
[Fig. 31B]
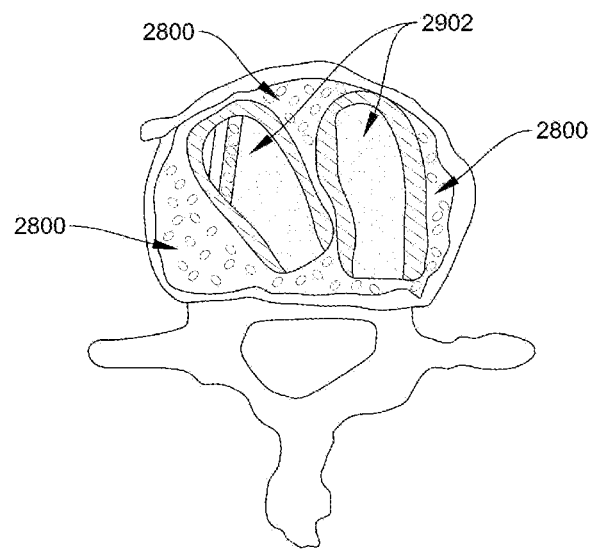

[Fig. 32A]
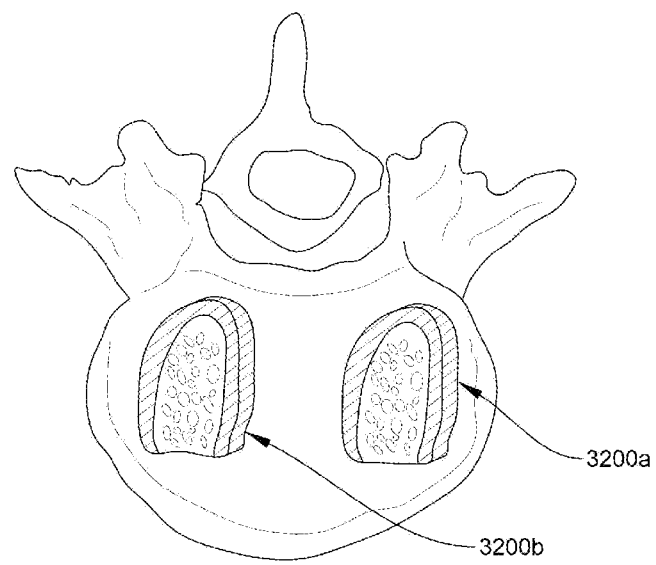
[Fig. 32B]
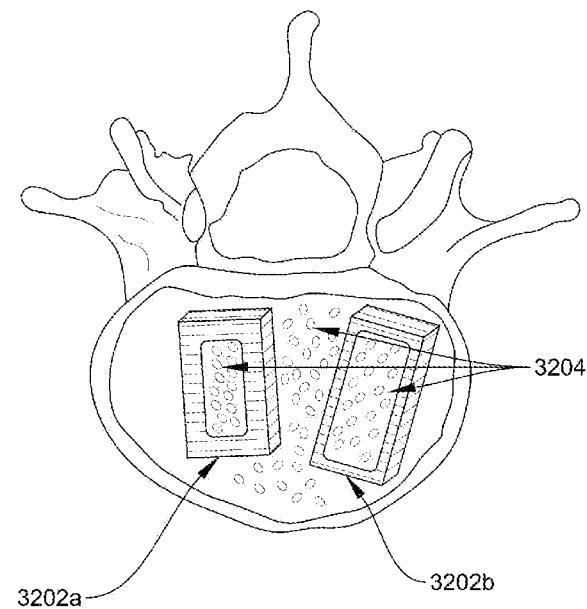

[Fig. 33A]
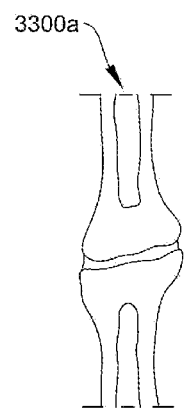
[Fig. 33B]
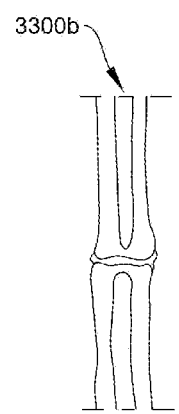

[Fig. 33C]
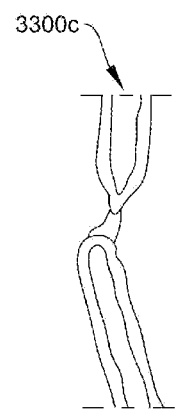
[Fig. 33D]
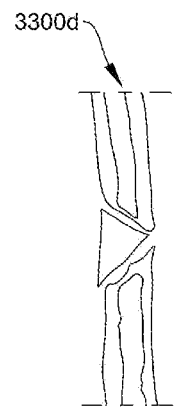

[Fig. 33E]
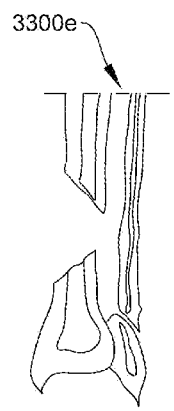
[Fig. 34A]
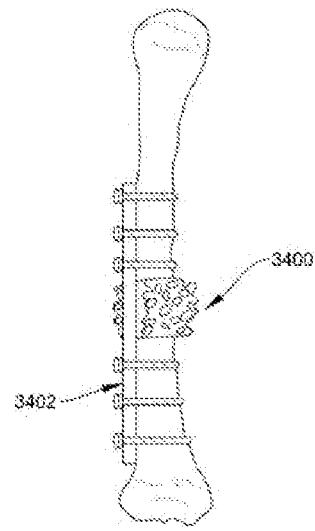

[Fig. 34B]
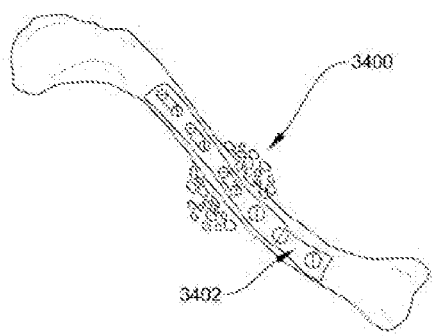
[Fig. 35]
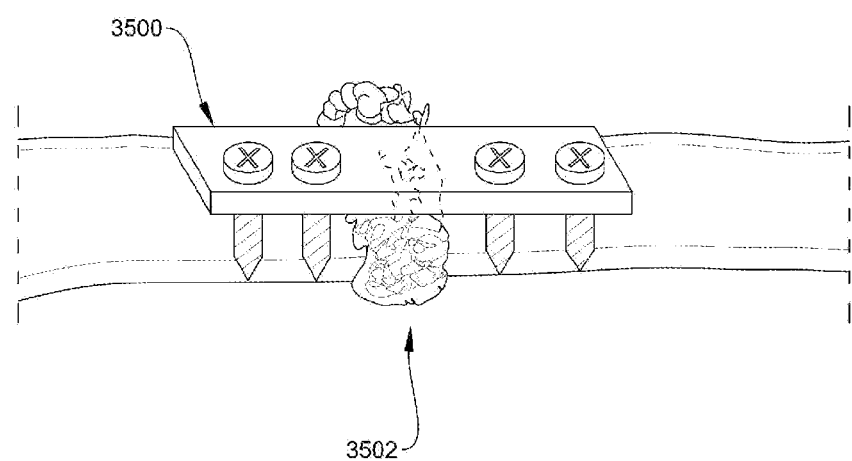

[Fig. 36]
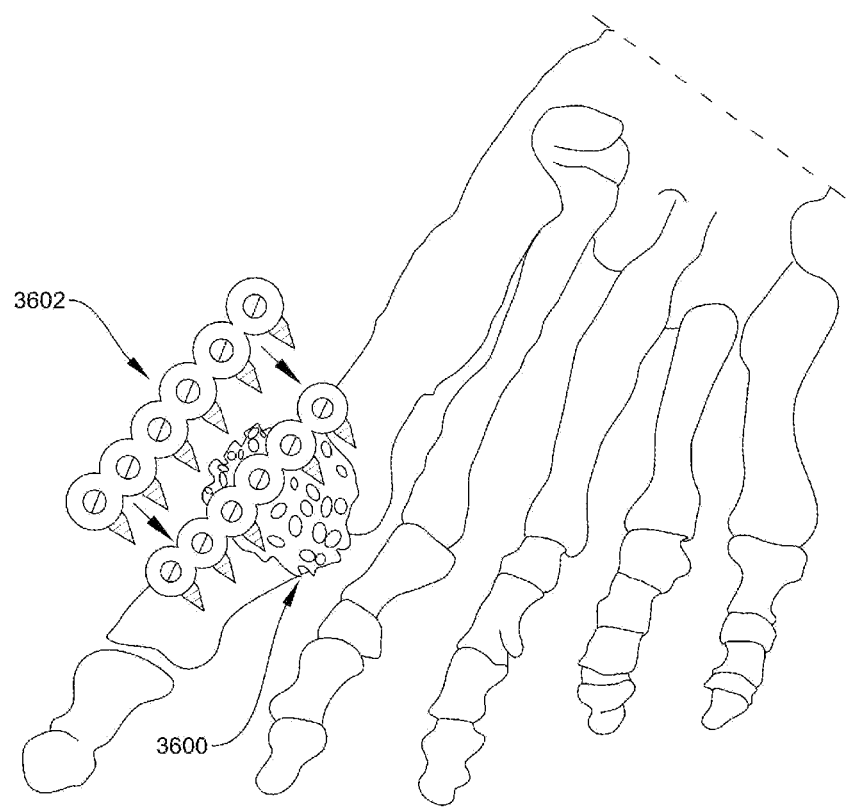

[Fig. 37A]
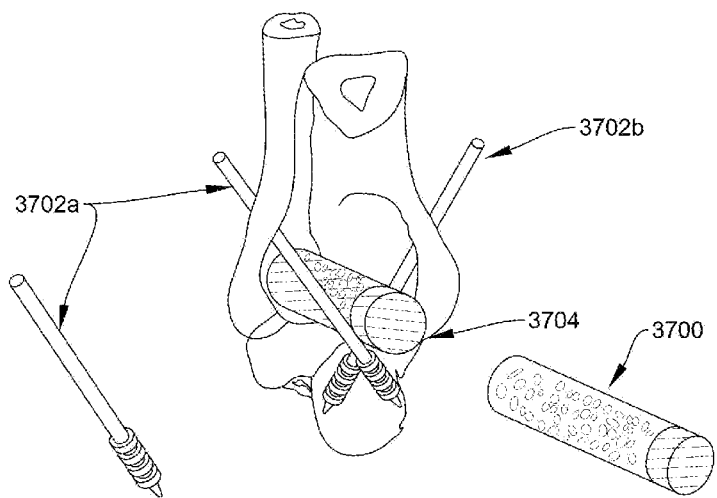
[Fig. 37B]
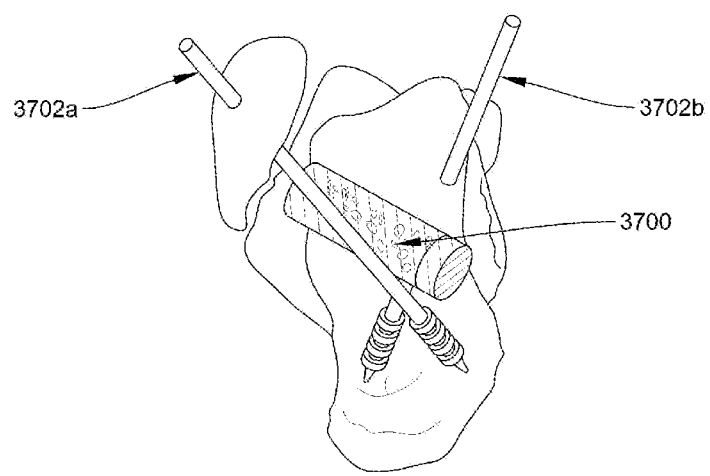

[Fig. 38]
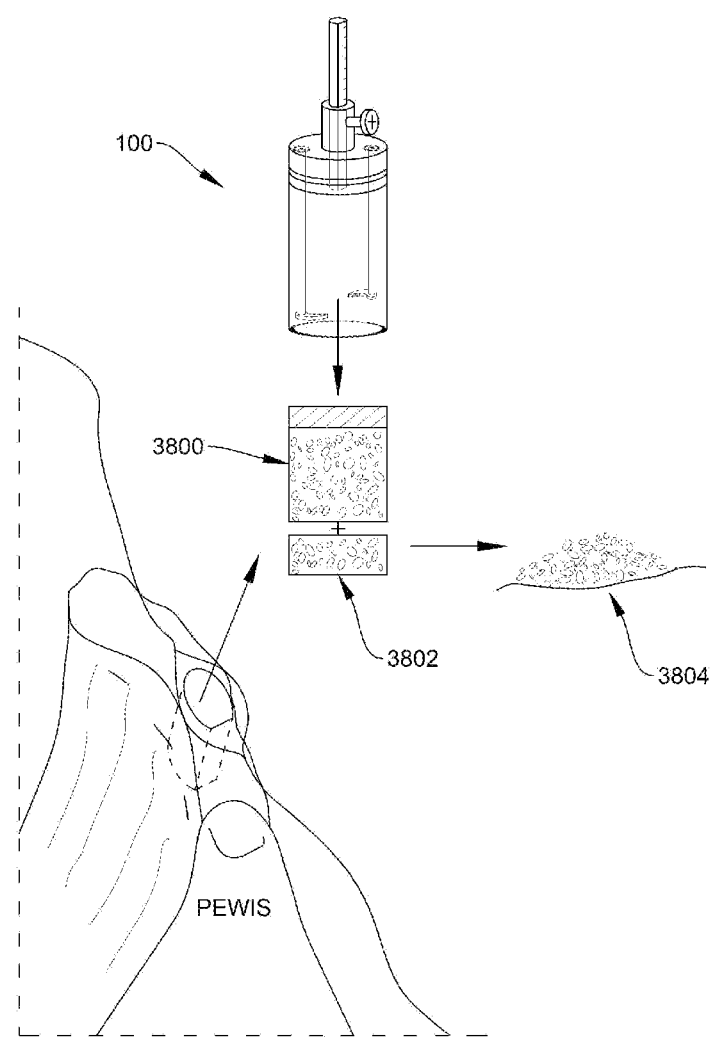

[Fig. 39]
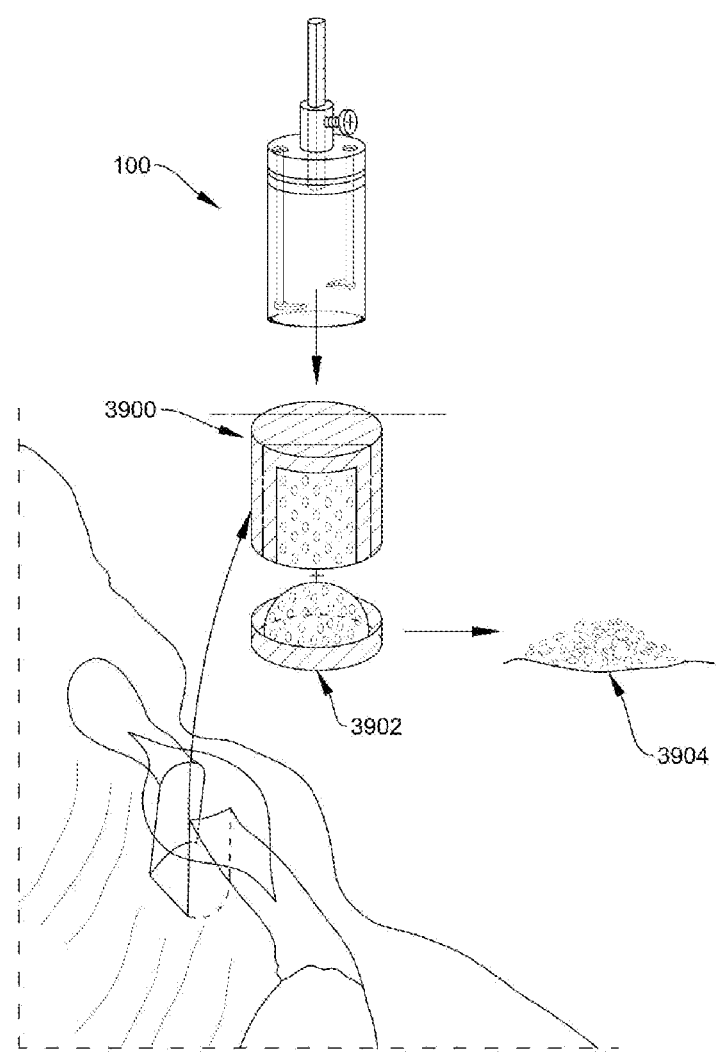

[Fig. 40A]
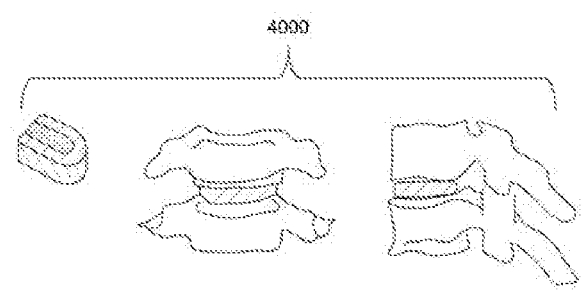
[Fig. 40B]
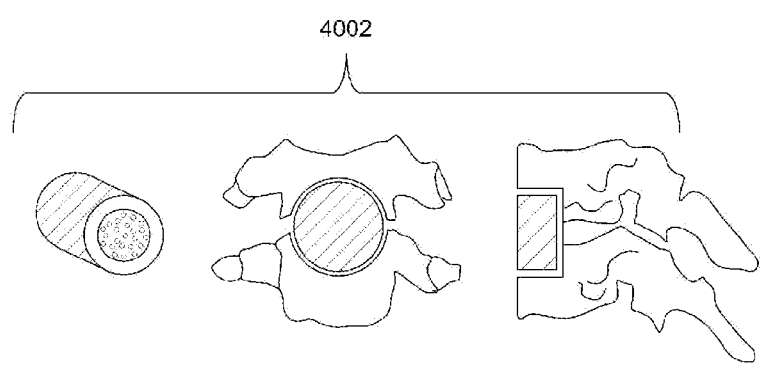

[Fig. 40C]
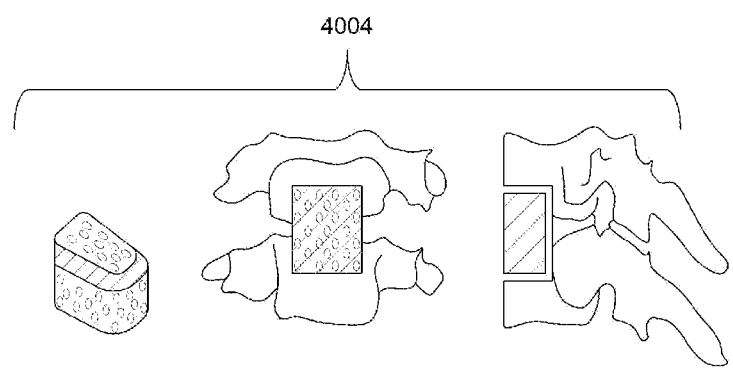

[Fig. 41]
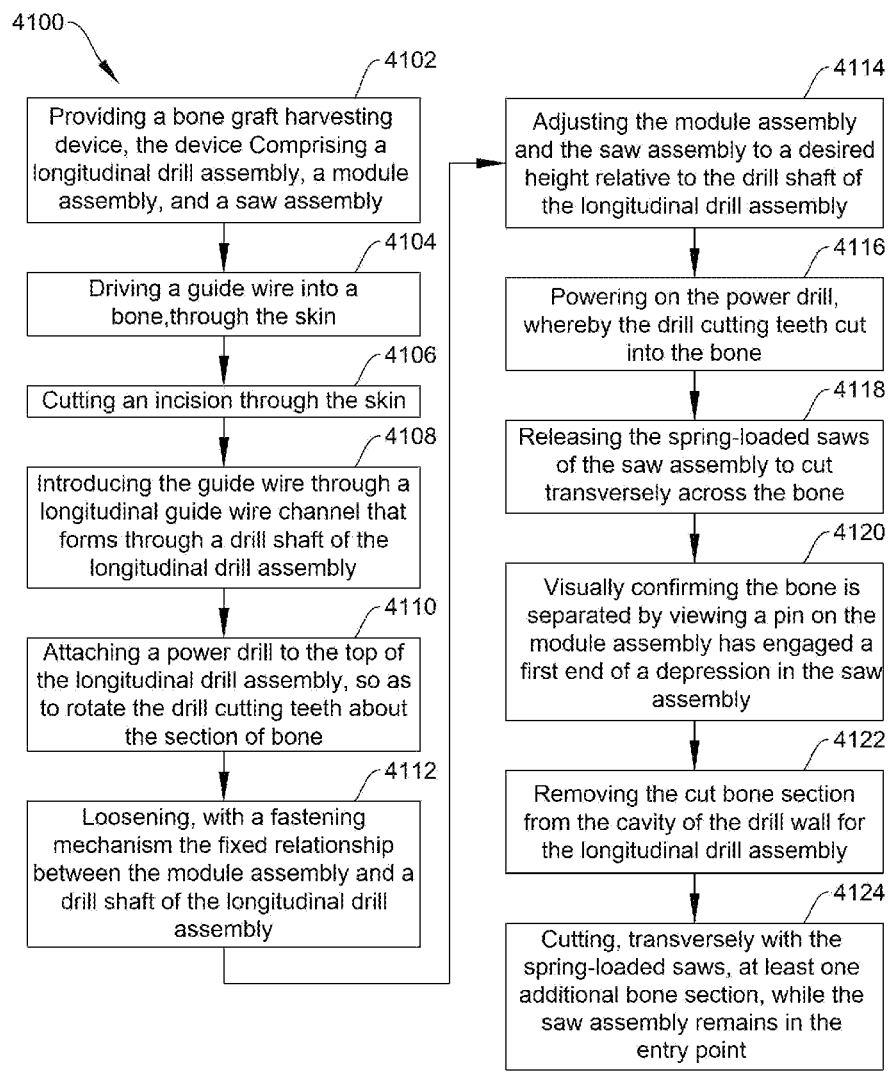

DEVICE AND METHOD FOR AUTOLOGOUS BONE GRAFT HARVESTING

TECHNICAL FIELD

The present invention relates generally to a device and method for autologous bone graft harvesting. More so, the present invention relates to a device that simultaneously cuts a cross-section of a bone, both longitudinally and transversely during a bone drilling procedure to obtain a bone block for repairing and rebuilding diseased bones through use of a longitudinal drill assembly for longitudinal cutting of a bone; a saw assembly for transverse sawing of the bone; and a module assembly for stabilizing.

BACKGROUND ART

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

It is known in the art that autologous bone graft is practiced in orthopedic surgical procedure as in the treatment of fracture non-union. This orthopedic medical procedure involves filling the defect after intraosseous lesions excision and for surgical arthodesisarthrodesis (fusion) of joints, including the spine. The iliac crest is the commonest donor site for bone grafting as compare to other sites because it is easily accessible, the bone quality is the best, and relatively large amount of graft can be taken safely. Autologous iliac crest bone graft is considered as "Gold Standard" because of it is osteoinductive, osteogenic, osteoconductive along with non-immunogenic properties compared to all other available bone graft substitutes.

It has been estimated that there are more than 1 million instrumented spinal procedures performed in the U.S. annually, and even more worldwide to treat patients suffering from debilitating back pain or injury. Aging population leads to an increase in spinal fusion. The percentage of the European population over the age of 65 equaled 19.7% in 2018, indicating a 2.6% increase since 2008; an even more dramatic increase is expected to occur by 2100.

A successful spinal fusion (arthrodesis) needs solid living bone tissue bridging adjacent vertebrae to provide long-term support. Bone grafting and stable internal fixation play the crucial roles in spinal fusion. Bone graft materials have one or more basic biological properties: an osteoconductive matrix, which supports the ingrowth of new bone; osteoinductive proteins, which facilitate the recruitment and proliferation of undifferentiated stem cells; and osteogenic cells (osteoblasts or osteoblast precursors), which are capable of forming bone in the proper environment. Autologous bone graft (Autograft) harvested from the iliac crest fulfils all three criteria and remains the gold standard material for use in achieving a successful spinal fusion. To date, autologous bone graft is the only biological substance demonstrated to possess osteogenic properties.

It is accepted worldwide that autograft is the gold standard for spinal fusion (arthrodesis), and also whenever bone healing is required in any part of the human skeleton, as its biological properties are considered to be optimum; autograft has a good volume effect, and also potent osteogenic, osteoinductive, and osteoconductive properties. Autograft can be used in spinal surgery either as cancellous chips or as a tricortical live implant in order to improve the immediate strength of the construct. So far, no allogeneic (allograft, cadaver bone from the Bone Bank) or synthetic bone substitutes have achieved the osteogenicity of autograft, although careful autograft implantation for spinal surgery must include shortening the harvesting-to-implant interval, because these properties diminish with time.

Typically, allografts are commercially prepared and typically are obtained from cadaver bone. They are characterized by delayed vascularization and incorporation, which is believed to be due to antigenic recognition by the host. Allografts are appropriate in a variety of clinical situations. They are most commonly used for ventral cervical interbody fusions, where single-level allografts generally can lead to successful solid arthrodesis, similar to the fusion rate with autograft. However, they incorporate relatively slowly, and, if used for multilevel fusions, are associated with a failure rate or pseudarthrosis rate of 63-70%.

Unfortunately, bone loss persists to be an important challenge in surgery, and many bone product alternatives are available. Despite the improvement of research, living human bone grafts (autografts) persist to be the most effective bone substitutes to replace bone loss. Alternatives to autologous bone grafts including allografts and synthetic bone substitutes lacks of one or more of the concepts of the "Diamond theory" of Giannoudis: osteogenic cells and vascularization, mechanical stability, growth factors, osteoconductive scaffolds (in combination with growths factors), that are a prerequisite for bone healing. Moreover most alternatives are expensive and not validated by Evidence Based Medicine EBM, thus being scarcely recommendable for clinical use.

It is known in the art that harvesting autologous bone graft from iliac crest may be associated with donor site complications and morbidity, wide range of complication rates from 9.4-49% have reported by various studies, with minor and major complication rates ranging from 6-39% and 0.7-25% consequently. Pain at donor site, hematoma and seroma formation, gait disturbance, sensory loss, and surgical site infection are commonly reported complications. Pain is the commonest complication was reported by various studies.

Furthermore, R. Pollock et al in his study reported 91.3% patients suffered from pain, out of 25 only 1 (4%) patient developed hematoma, parasthesias at the donor site was experienced by 34.8% and a walking support was used by 19.1% after harvesting bone graft from anterior iliac crest. The most frequently cited complications of iliac bone harvesting are gait disturbance, post-surgical pain, excessive blood loss, and paresthesia. A 2% incidence of permanent sensory disturbance within the dermatomal distribution of the lateral femoral cutaneous nerve has been reported. Muscle dissection can contribute markedly to blood loss, disturbance of gait, and post-surgical pain.

The current trend in most surgical specialties is the development of minimally invasive surgery techniques, or keyhole techniques, which are designed to reduce soft tissues incisions, reduce muscle dissections and minimize post-operative morbidity. Sophisticated instrumentation and miniaturized devices have been developed to facilitate such surgery. Traditionally, autologous bone from the iliac crest has been harvested as cortico-cancellous blocks using an open surgery approach, which requires significant dissection of the soft tissues. Elevation of musculo-periosteal flaps to gain access to the iliac crest may result in significant post-operative morbidity, including pain, potential neurovascular damages, haematoma, delayed ambulation, increased operation time and increased length of hospital stay.

Compared to the complications published with respect to open iliac crest grafting, a minimally invasive surgery technique which does not involve significant soft tissue dissection seems both simple and attractive and may help to reduce donor site morbidity, to reduce blood loss and, to reduce operation theatre time and associated costs.

At the present time autologous iliac crest bone grafts continue to be the gold standard for spinal fusion (arthrodesis), and also whenever bone healing is required in any part of the skeleton, as its biological properties are considered to be optimum. The increased success and predictability associated with the use of autologous bone graft has provided the motivation to consider a keyhole technique, or minimally invasive surgery technique, to harvest this vital bone.

Other proposals have involved bone grafting devices and methods. The problem with these bone grafting devices is that they do not allow for controllable cutting of the bone, both inwardly for internal bone harvesting, and outwardly for external bone harvesting. Also, the bone grafting devices do not allow the surgeon to control the depth and longitudinal position of the cut. Also, the handle used to control the gripping device is not easily accessible. Even though the above cited gripping devices meets some of the needs of the market, an efficient and versatile device and method for autologous bone graft harvesting offers new advantages and is desirable. More so, the present invention relates to a device and method for autologous bone graft harvesting that simultaneously cuts a cross-section of a bone, both longitudinally and transversely during a bone drilling procedure to obtain a bone block for repairing and rebuilding diseased bones through use of a longitudinal drill assembly for longitudinal cutting of a bone; a saw assembly for transverse sawing of the bone; and a module assembly for stabilizing, is still desired.

SUMMARY OF INVENTION

Illustrative embodiments of the disclosure are generally directed to a device and method for autologous bone graft harvesting. The device and method utilize a synergistic combination of a longitudinal drill assembly, a module assembly, and a saw assembly operational through spring-tension for an orthopedic surgical procedure. In one possible embodiment, the device is configured to cut a cross-section of a bone during a bone drilling procedure in order to obtain a single bone block and/or additional bone blocks, if required. This for the purpose of augmenting and reconstructing diseased bones. The device and method may also be used for eclectic medical surgeries, such as orthopedic surgery, spinal surgery, oral surgery, and plastic surgery.

In one embodiment, the device and method for autologous bone graft harvesting utilizes the longitudinal drill assembly and the saw assembly to simultaneously cut a cross-section of a bone, both longitudinally with the longitudinal drill assembly, and transversely with the saw assembly. This cutting and sawing procedure is performed during a bone drilling procedure to harvest a bone block from the body for purposes of augmenting and reconstructing a diseased bone. The device is hand-controllable, drill motor powered, and spring-tensioned to selectively cut internally to the captured bone for internal bone harvesting.

The longitudinal drill assembly is configured to be guided by a guide wire, and rotatably powered by a power drill to longitudinally drill a cross section of bone at a selected position of the body. The saw assembly is configured to efficiently rotate along a perpendicular plane inwardly for internal cutting of the bone. The module assembly provides increased stability during cutting and sawing operations.

Further, the device is hand-controllable to selectively cut internally to the device, so as to cut captured bone for internal bone harvesting. The device also selectively cuts surrounding bone outside the device for external bone harvesting. The saw is biased to stow in a wall space when not in use, and rotate along a perpendicular plane inwardly or outwardly for internal or external cutting of the bone, respectively. The saw rotatably extends inwardly to support and carry the bone block after a longitudinal section has been cut. The saw rotatably extends outwardly to release the bone block after the bone grafting procedure.

In some embodiments, the device for autologous bone graft harvesting comprises a longitudinal drill assembly. The longitudinal drill assembly includes a drill wall comprising an upper section and a lower section, the lower section forming an opening to a cavity, the lower section comprising a plurality of drill cutting teeth, the drill wall further forming at least one wall pocket.

The longitudinal drill assembly may also include a drill plate disposed at the upper section of the drill wall, the drill plate forming one or more rod holes.

The longitudinal drill assembly may also include a drill shaft extending perpendicular from the drill plate, the drill shaft defined by a flat surface, the drill shaft forming a longitudinal guide wire channel.

The drill shaft is substantially aligned with, and rotatable about a longitudinal axis.

In other embodiments, the device for autologous bone graft harvesting comprises a module assembly. The module assembly includes a module plate disposed above the drill plate in an adjacent, parallel relationship.

The module plate is defined by an upper face and a lower face, the module plate forming one or more rod holes, the rod holes in the module plate being in substantial alignment with the rod holes in the drill plate.

The module assembly may also include one or more pins extending from the upper face of the module plate.

The module assembly may also include a module shank extending perpendicular from the module plate, the module shank defined by a wide upper end, a narrow lower end, whereby a shank shoulder forms between the upper and lower ends.

The module shank is also defined by a module tunnel having a flat surface, the module tunnel adapted to receive the drill shaft.

The module assembly is operable to be displaced axially relative to the longitudinal drill assembly.

The flat surfaces of the drill shaft and the module shank align to at least partially restrict rotation by the module assembly relative to the longitudinal drill assembly.

In other embodiments, the device for autologous bone graft harvesting comprises a saw assembly. The saw assembly includes a saw plate being disposed between the module plate and the shank shoulder of the module shank in a snug relationship.

In this manner, axial displacement of the saw plate relative to the module plate is at least partially restricted.

Also, the saw assembly is operable to be displaced axially relative to the longitudinal drill assembly.

The periphery of the saw plate forming one or more elongated slots having a pair of opposing ends, the slots adapted to receive the pins extending from the upper face of the module plate.

In this manner, the saw plate is adapted to rotate in two directions until the pins engage one of the ends of the elongated slots.

The saw plate comprises an internal mesh.

The saw assembly may also include one or more gears operatively joined with the internal mesh of the saw plate, whereby the saw plate and the gears rotate in opposite directions.

The saw assembly may also include one or more rods extending through the rod holes in the drill plate and the module plate.

The rods are defined by a top end and a bottom end, the top end of the rods being operatively joined with the gears, whereby the rods rotate in conjunction with the gears.

The saw assembly may also include a pair of saws comprising multiple saw cutting teeth and a tip.

The saws join with the saw end of the rods, whereby the saws rotate in conjunction with the rods.

In this manner, during rotation, the tips of the saws move distally from each other to an open position, until the pins of the module plate engage a first end of the slot formed in the saw plate.

Also, during rotation, the tips of the saws move in proximity to each other near the longitudinal axis to a closed position, until the pins of the module plate engage a second end of the slot formed in the saw plate.

In another aspect, the device further comprises a depth gauge disposed on the flat surface of the drill shaft.

In another aspect, the depth gauge measures the position of the module assembly and the saw assembly relative to the longitudinal drill assembly.

In another aspect, the device further comprises a guide wire, the guide wire extending through the longitudinal guide wire channel of the drill shaft.

In another aspect, the device further comprises a fastening mechanism passing through the module shank, the fastening mechanism operable to help fasten the drill shaft to the inside surface of the module tunnel.

In another aspect, the device further comprises a spring extending between the stabilizing module assembly and the saw assembly, the spring biasing the saw plate to rotate towards the closed position.

In another aspect, the spring extends between the module shank of the stabilizing module assembly and the saw plate of the saw assembly.

In another aspect, the device further comprises a motorized drill joined with the longitudinal drill assembly, the motorized drill rotatably driving the longitudinal drill assembly.

In another aspect, the drill wall is defined by a cylindrical shape.

In another aspect, the module plate and the saw plate are defined by a disc shape.

In another aspect, the saws join with the saw end of the rods in a perpendicular relationship.

In another aspect, the rods rotate about a pivot axis, the pivot axis being in a spaced-apart, parallel relationship with the longitudinal axis.

In another aspect, the saws rotate in conjunction with the rods along a perpendicular plane.

In another aspect, the saws, while in the open position, are operable to stow in the wall pocket.

One objective of the present invention is to provide a transversally cutting saw that rotates along a perpendicular plane inwardly or outwardly for internal or external cutting of the bone, respectively.

Another objective is to enable the operating surgeon to cut a cylindrical block of bone of a certain length, and that is evenly divided into two or three sections, and that is utilized as two or three discs.

Another objective is to rotatably extend the saw inwardly to support and carry the bone block after a longitudinal section has been cut.

Another objective is to rotatably extend the saw outwardly from the device to release the bone block after the bone grafting procedure.

Another objective is provide control of the saw with an interconnecting lever that is easily controlled by the thumb.

Yet another objective is to provide a bone grafting device that is suitable for medical surgery including orthopedic surgery, spinal surgery, oral surgery and plastic surgery.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF DRAWINGS

The invention will now be described, by way of example, with reference to the accompanying drawings, in which:

FIG. 1 illustrates a perspective view of an exemplary device for autologous bone graft harvesting, showing a longitudinal cutting member being rotatably driven by a motorized drill, in accordance with an embodiment of the present invention;

FIGS. 2A-2B illustrate sectioned views of an exemplary longitudinal drill assembly, where FIG. 2A shows a sectioned side view, and FIG. 2B shows the wall pocket in the drill wall carrying a pair of saws, in accordance with an embodiment of the present invention;

FIG. 3 illustrates a perspective view of an exemplary module assembly, in accordance with an embodiment of the present invention;

FIG. 4 illustrates a perspective views of an exemplary saw assembly, in accordance with an embodiment of the present invention;

FIG. 5 illustrates a perspective views of an exemplary device for autologous bone graft harvesting, showing the module assembly and saw assembly raised position relative to the drill shaft, in accordance with an embodiment of the present invention;

FIG. 6 illustrates a perspective views of an exemplary device for autologous bone graft harvesting, showing the module assembly and saw assembly lowered position relative to the drill shaft, in accordance with an embodiment of the present invention;

FIGS. 7A-7B illustrate sectioned views of the saws in the saw assembly inside the cavity of the drill wall for the drill assembly, where FIG. 7A shows the saws in the open position, and FIG. 7B shows the saws in the closed position, in accordance with an embodiment of the present invention;

FIGS. 8A-8B illustrate sectioned views of an exemplary spring extended between the saw assembly and the module assembly, where FIG. 8A shows the spring biased to the open position, and FIG. 8B shows the saws rotated to the closed position, in accordance with an embodiment of the present invention;

FIG. 9 illustrates an exemplary bone graft procedure, showing a guide wire prepared to be driven into the skin, in accordance with an embodiment of the present invention;

FIG. 10 illustrates an exemplary bone graft procedure, showing an incision being cut in the skin, in accordance with an embodiment of the present invention;

FIG. 11 illustrates an exemplary bone graft procedure, showing soft tissues are reflected on either side of the incision, in accordance with an embodiment of the present invention;

FIG. 12 illustrates an exemplary bone graft procedure, showing a soft tissue retractor placed at the incision, in accordance with an embodiment of the present invention;

FIG. 13 illustrates an exemplary bone graft procedure, showing a power drill attached to the top of a longitudinal drill assembly, in accordance with an embodiment of the present invention;

FIG. 14 illustrates an exemplary bone graft procedure, showing the initiation of the drilling into the bone with the longitudinal drill assembly, in accordance with an embodiment of the present invention;

FIG. 15 illustrates an exemplary bone graft procedure, showing an exemplary fastening mechanism loosening the saw assembly and module assembly from the drill shaft, in accordance with an embodiment of the present invention;

FIG. 16 illustrates an exemplary bone graft procedure, showing the saws spinning around the bone and simultaneously cutting across the bone between, in accordance with an embodiment of the present invention;

FIG. 17 illustrates an exemplary bone graft procedure, showing the harvested bone being released from the cavity of the drill wall for the longitudinal drill assembly, in accordance with an embodiment of the present invention;

FIG. 18 illustrates an exemplary bone graft procedure, showing the point incision stitched after removal of the device, in accordance with an embodiment of the present invention;

FIGS. 19A-19C illustrates perspective view of an exemplary bone graft procedure, showing the initiation of the drilling into the bone with the longitudinal drill assembly, where FIG. 19A shows the drill shaft, incorporating a longitudinal guide wire channel at its center to accommodate a guide wire, FIG. 19B shows the depth adjusted before cutting, and FIG. 19C shows the saw assembly lowered for cutting a section of bone, in accordance with an embodiment of the present invention;

FIGS. 20A-20B illustrates perspective view of an exemplary saw assembly with saws, where FIG. 20A shows the saws in the raised position, and FIG. 20B shows the saws in the lowered position, in accordance with an embodiment of the present invention;

FIG. 21 illustrates a perspective view of the drill assembly releasing a first section of bone, and a subsequently drilled second section of bone, in accordance with an embodiment of the present invention;

FIG. 22 illustrates a cross-sectional view of the pelvis Iliac Crest, with the guide wire driven through the soft tissues and into the pelvis, in accordance with an embodiment of the present invention;

FIG. 23 illustrates a cross-sectional view of the longitudinal drill assembly entering the top of the Iliac Crest and fall within both side surfaces, or both side cortical plates, in accordance with an embodiment of the present invention;

FIG. 24 illustrates a cross-sectional view of the pelvis Iliac Crest, with the device entering the top of the Iliac Crest, in accordance with an embodiment of the present invention;

FIG. 25 illustrates a cross-sectional view of a limited portion of the Iliac Crest removed as a result of harvesting an essential Tricortical Bone Block, in accordance with an embodiment of the present invention;

FIGS. 26A-26B illustrate a perspective view of a Tricortical Bone Block, where FIG. 26A shows how the device is utilized to firstly harvest a Tricortical Bone Block 2500, which is still cylindrical in shape. FIG. 26B shows the top view of the cylindrical Tricortical Bone Block, in accordance with an embodiment of the present invention;

FIG. 27 illustrates a perspective view of the middle portion sectioning/cutting of the cylindrical tricortical bone block, and in scientific terms, it is exactly this middle portion which suddenly becomes the 'textbook' clinically applicable 'Tricortical Bone Graft' or C-Type Autograft (or the Smith-Robinson Horse-Shoe Shaped Disc) which is immediately suitable to be inserted into the Spine Disc Spaces and/or commonly used to repair other parts of the skeleton, in accordance with an embodiment of the present invention;

FIGS. 28A-28B illustrate a perspective view of the unicortical bone block or the tri-cortical bone block can be readily converted into bone chips, or bone fragments, where FIG. 28A shows the mallet, forceps, and bone miller, and FIG. 28B shows the tri-cortical bone block can be readily converted into morselized bone grafts, or bone chips, in accordance with an embodiment of the present invention;

FIG. 29 illustrates a perspective view of a standard motorized round burr to remove the old degenerated Spine Disc from the Disc Space in the spine, in accordance with an embodiment of the present invention;

FIG. 30 illustrates a perspective view of the Tricortical Bone Graft harvested from the Iliac Crest being inserted into the spine space, in accordance with an embodiment of the present invention;

FIGS. 31A-31B illustrate perspective views of the Tricortical Bone Graft harvested from the Iliac Crest, where FIG. 31A shows a side sectioned side view of the spine with the harvested Tricortical Bone Graft inserted into the spine space and the remaining spine space is filled with additional bone chips (Morselized Bone Grafts), and FIG. 31B shows a front sectioned side view of the spine with the harvested Tricortical Bone Graft inserted into the spine space and the remaining spine space is filled with additional bone chips (Morselized Bone Grafts), in accordance with an embodiment of the present invention;

FIGS. 32A-32B illustrate a top view of the spine space, with two Tricortical Bone Grafts placed into it, where FIG. 32A shows two titanium cages 3202a, 3202b packed with bone chips, and FIG. 32B shows two titanium cages 3202a, 3202b packed with bone chips, in accordance with an embodiment of the present invention;

FIGS. 33A-33E illustrate perspective view of various example types of nonunion fractures, where FIG. 33A shows a hypertrophic nonunion fracture 3300a, FIG. 33B shows an oligotrophic nonunion fracture, FIG. 33C shows an atrophic nonunion fracture, FIG. 33D shows a necrotic nonunion fracture, FIG. 33E shows a defect nonunion fracture, in accordance with an embodiment of the present invention;

FIGS. 34A-34B illustrate a top view of the repair of nonunion fracture using Morselized Bone Grafts, where FIG. 34A shows the repair of a Humerus, and FIG. 34B illustrates the repair of a Clavicle, in accordance with an embodiment of the present invention;

FIG. 35 illustrates a side view of the fracture repair of a long bone using plate and screws and Morselized Bone Grafts harvested from the Iliac Crest, in accordance with an embodiment of the present invention;

FIG. 36 illustrates a side view of the fracture repair of a metatarsal bone using plate and screws and Morselized Bone Grafts harvested from the Iliac Crest, in accordance with an embodiment of the present invention;

FIGS. 37A-37B illustrate perspective views of the bone fusion of the ankle and heel bone, using a cylindrical graft, unicortical bone block harvested from the Iliac Crest, where FIG. 37A shows the two internal cross-screws for the fixation, and FIG. 37B illustrates the two internal cross-screws fully coupled to the bone, in accordance with an embodiment of the present invention;

FIG. 38 illustrates a side view of the device can be used to harvest a unicortical bone block from the top of the pelvis, in accordance with an embodiment of the present invention;

FIG. 39 illustrates a perspective view of the device being used to harvest a Tricortical Bone Block from the top of the pelvis, in accordance with an embodiment of the present invention;

FIGS. 40A-40C illustrate perspective views of spinal fusion techniques with different bones, where FIG. 40A shows a Robinson and Smith—Tricortical Iliac Crest Autograft, FIG. 40B shows a Cloward—Circular Cylindrical Autograft, and FIG. 40C shows Bailey and Badgley—Slot Graft or Trough-Type Autograft, in accordance with an embodiment of the present invention; and FIG. 41 illustrates a flowchart for an exemplary method for autologous bone graft harvesting, in accordance with an embodiment of the present invention.

Like reference numerals refer to like parts throughout the various views of the drawings.

DESCRIPTION OF EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A device 100 and method 4100 for autologous bone graft harvesting is referenced in FIGS. 1-41. The device 100 for autologous bone graft harvesting, hereafter "device 100" utilize a synergistic combination of a longitudinal drill assembly 102, a module assembly 118, and a saw assembly 126. The curing and sewing action is possible through a motorized power drill 1300, and tensioned springs 500 that work together to perform an orthopedic surgical procedure. In one possible embodiment, the device 100 is configured to cut a cross-section of a bone 900 during a bone drilling procedure in order to obtain a single bone block or additional bone blocks. This enables efficacious augmenting and reconstructing diseased bones. The device 100 and method 4100 may also be used for eclectic medical surgeries, such as orthopedic surgery, spinal surgery, oral surgery, and plastic surgery.

The components of the device 100 work together in synergistic harmony to enhance the augmentation and reconstruction of diseased bones. In one embodiment, a longitudinal drill assembly 102 is configured to be guided by a guide wire, and rotatably powered by a power drill 1300 to longitudinally drill a cross section of bone 900 at a selected position of the body. A saw assembly 126 is configured to efficiently rotate along a perpendicular plane inwardly for internal cutting of the bone. And a module assembly 118 sandwiched between the longitudinal drill assembly 102 and saw assembly 126, is configured to increase stability during cutting and sawing operations.

As referenced in FIG. 2A, the device 100 comprises a longitudinal drill assembly 102. The longitudinal drill assembly 102 includes a drill wall 104 comprising an upper section 106a and a lower section 106b. In one non-limiting embodiment, the drill wall 104 is defined by a cylindrical shape. The lower section 106b of the drill wall 104 forms an opening to a cavity 108. The cavity 108 is sized to cut a cross section of the bone 900. The saws, described below, also cut transversely across the cavity 108. The lower section 106b of the drill wall 104 comprises a plurality of drill cutting teeth 110a and 110n operable to drill into the bone 900.

Looking again at FIG. 2A, the drill wall 104 forms at least one wall pocket 202a, 202b. The wall pocket is sized and dimensioned to stow the saws 136a and 136b when not in use, as described below and illustrated in FIG. 2B. Thus, when the saws 136a and 136b are rotated to an open position 700a, the wall pockets 202a and 202b receive the saws 136a and 136b in a protective capsule along the sides of the drill wall 104. As illustrated, the wall pockets 202a and 202b may have a rectangular shape. However, other shapes and dimensions are possible.

The longitudinal drill assembly 102 may also include a drill plate 112 disposed at the upper section 106a of the drill wall 104. The drill plate 112 forms one or more rod holes 200a, 200b on opposing ends of the drill plate 112. As described below, the rod holes 200a and 200b enable passage of a pair of rods 130a and 130b that carry the saws 136a and 136b.

The longitudinal drill assembly 102 may also include a drill shaft 114 that extends perpendicular from the drill plate 112. The drill shaft 114 is substantially aligned with, and rotatable about a longitudinal axis 208. This creates a stable, longitudinal drilling action that enhances bone harvesting. The drill shaft 114 is defined by a flat surface 204 that restricts rotation from an attached module assembly 118, and supports a visual depth marking gauge with millimeter markings.

In some embodiments, the device 100 further comprises a depth gauge 116 disposed on the flat surface 204 of the drill shaft 114. The depth gauge 116 is configured to measures the position of a module assembly 118 and a saw assembly 126 relative to the longitudinal drill assembly 102. In one non-limiting embodiment, the depth gauge 116 comprises a series of spaced-apart etchings separated in millimeter increments.

The drill shaft 114 forms a longitudinal guide wire channel 206. In some embodiments, the device 100 utilizes a guide wire 904 that is inserted into the bone 900. The guide wire is utilized to guide the longitudinal drill assembly 102. The guide wire extends through the longitudinal guide wire channel 206 of the drill shaft 114. It is significant to note that the guide wire 904 is utilized, primarily to guide the pathway into the pelvis. After which, the guide wire 904 is irrelevant or redundant. Even if the device 100 needs to drill down any further, the pathway downwards is already sufficiently set, and the device 100 merely follows the surrounding recess/groove formed by the guide wire 904.

In some embodiments, the device 100 further comprises a motorized drill that operatively joins with the longitudinal drill assembly 102. The motorized drill is configured to rotatably drive the longitudinal drill assembly 102 for cutting a cross section of the bone.

Looking now at FIG. 3, the device 100 comprises a module assembly 118. The module assembly 118 includes a module plate 120 that is disposed above the drill plate 112 in an adjacent, parallel relationship. In one non-limiting embodiment, the module plate 120 is defined by a disc shape.

The module plate 120 is defined by an upper face 308a and a lower face 308b. The module plate 120 forms one or more rod holes 300a, 300b. The rod holes 300a and 300b are in substantial alignment with the rod holes 200a and 200b in the drill plate 112. This allows a pair of rods 130a and 130b, described below, to pass through both sets of rod holes 200a and 200b, 300a and 300b, respectively.

The module assembly 118 may also include one or more pins 302a, 302b extending from the upper face 308a of the module plate 120. The pins are configured to engage opposing ends of the slot in the saw plate 128, so as to restrict excessive rotation towards the open and closed positions 700a, 700b of the saws.

The module assembly 118 may also include a module shank 122 extending perpendicular from the module plate 120. The module shank 122 defined by a wide upper end 124a, a narrow lower end 124b, whereby a shank shoulder 310 forms between the upper and lower end 124a and 124b.

The module shank 122 is also defined by a module tunnel 306 having a flat surface 304. The module tunnel 306 is sized and dimensioned to receive the drill shaft 114. In some embodiments, the device 100 further comprises a fastening mechanism 142 that passes through the module shank 122. When rotated in one direction, the fastening mechanism 142 is configured to help fasten the drill shaft 114 to the inside surface of the module tunnel 306. When rotated in an opposite direction, the fastening mechanism 142 releases the module assembly 118 to move axially along the length of the drill shaft 114. In some embodiments, the fastening mechanism 142 may include, without limitation, a titanium screw, metal screw, bolt, or other fastening means known in the art of orthopedic surgical procedures.

The module assembly 118, along with the attached saw assembly, are operable to be displaced axially relative to the longitudinal drill assembly 102 through slidable positioning relative to the drill shaft. This allows for depth adjustments for sawing the bone.

The flat surfaces 204, 304 of the drill shaft 114 and the module shank 122 align to at least partially restrict rotation by the module assembly 118 relative to the longitudinal drill assembly 102.

As FIG. 4 references, the device 100 comprises a saw assembly 126, which is depth adjusted to a desired height relative to the longitudinal drill assembly 102 for transverse sawing of the bone. It is significant to note that the longitudinal drill assembly 102, the module assembly 118, and the saw assembly 126 are all separable from one another and thus individually replaceable. As illustrated, the saw assembly 126 comprises a saw plate 128. The saw plate 128 forms a central aperture 406 sized to receive the drill shaft 114. The saw plate 128 is disposed between the module plate 120 and the shank shoulder 310 of the module shank 122 in a parallel, snug relationship.

In this manner, and due to the snug, coupled relationship therebetween, the axial displacement of the saw plate 128 relative to the module plate 120 is at least partially restricted. And while their relative axial displacement is limited; the saw assembly 126, and the module assembly can be displaced axially (upwardly and downwardly) along the drill shaft 114 of the longitudinal drill assembly 102. This allows for a unique depth adjustment function to achieve precise cutting of the bone with the saws 136a and 136b of the saw assembly 126.

As discussed above, the saw assembly 126 and the module assembly 118 are snugly fitted together. This allows them to be depth-adjusted, so as to move axially along the drill shaft 114. Through this precision measurement, the saws 136a and 136b of the saw assembly, and the drill cutting teeth 110a and 110n of the longitudinal drill assembly 102 can be positioned at a desired height relative to the bone. This axial height adjustment capacity creates a more precise cutting and sawing measurement.

For example, FIGS. 5 and 6 show the free axial capacity of the saw assembly 126 and the module assembly 118 to slide upwardly and downwardly along the length of the drill shaft 114. The rods 130a and 130b are also shown sliding through their respective rod holes 200a and 200b, 300a and 300b in conjunction with the saw assembly 126 and module assembly 118. The drill shaft, and depth gauge thereon, remain relatively stationary during depth adjustments.

As FIG. 5 illustrates, the saw assembly 126 and the module assembly 118 are moved up relative to the longitudinal drill assembly 102 to a raised position 502. The saw assembly 126 and the module assembly 118 are pulled up to their maximum extent, and are situated higher than the drill plate 112. In the raised position 502, the saws 136a and 136b reside just below the drill plate 112, at the upper section 106a of the drill wall 104. Furthermore, the saws 136a and 136b work to limit further upward movements of saw assembly 126 and the module assembly 118, as the saws 136a and 136b engage the drill plate 112.

Turning now to FIG. 6, the saw assembly 126 and the module assembly 118 are shown being moved downwardly relative to the longitudinal drill assembly 102 to a lowered position 600. When pushed down to the lowered position 600, the rods 130a and 130b pass through their respective rod holes, and into the wall pockets 202a and 202b of the drill wall 104. As illustrated, the saw assembly 126 and the module assembly 118 are pushed down to their maximum extent to rest on the drill plate 112, with the module plate 120 abutting the drill plate 112. In this lowered position 600 configuration, the saws reside near at the lower section 106b of the drill wall 104. The module plate 120 now serves to limit all further downward movements of the saw assembly 126 and the module assembly 118 relative to the drill shaft 114.

The desired height for cutting and sawing is achieved by measuring the depth gauge 116 disposed on the flat surface 204 of the drill shaft 114. Once the desired height is achieved the fastening mechanism 142 is rotated in one direction to fasten the drill shaft 114 to the inside surface of the module tunnel 306, which also serves to secure the saw assembly 126 and the module assembly 118 in a fixed position relative to the longitudinal drill assembly 102. When rotated in an opposite direction, the fastening mechanism 142 releases the module assembly 118 to move axially along the length of the drill shaft 114.

In one embodiment, the vertical positions along the depth gauge 116 can be referenced by their millimeter markings etched on the drill shaft. Further, the top-edge of the module shank 122 can be used as a pointer to indicate the height against the millimeter markings, so as to achieve a depth referencing reading with the depth gauge 116.

For example, if the maximum top position is marked as zero millimeters, i.e., 0.00 mm, the saw assembly 126 and the module assembly 118 are at the raised position relative to the drill shaft 114. This corresponds to the saws 136a and 136b being at or near the upper section 106a of the drill wall 104. However, if the maximum lowered position is marked as 10.00 mm, the saw assembly 126 and the module assembly 118 are at their lowest position relative to the drill shaft 114. This corresponds to the saws 136a and 136b being at or near the lower section 106b of the drill wall 104. Any depth between the raised and lowered positions is also possible to adjust.

It is also significant to note that the length of the rods 130a and 136b corresponds to the length of the drill wall 104. Thus, the saw assembly 126 and the module assembly 118 are at a lowest position along the drill shaft 114, and the saws 136a and 136b are in ready sawing position at the lower section 106b of the drill wall 104. This is the same depth as the drill cutting teeth 110a and 110n, or about a millimeter short thereof.

Looking again at FIG. 4, the saw assembly 126 comprises a saw plate 128. The saw plate 128 may be defined by a disc shape. However, other shapes and dimensions may also be used in other embodiments. The periphery of the saw plate 128 forms one or more elongated slots 400a and 400b. The slots 400a and 400b serve as catches for restricting excessive rotation by the saw assembly 126. The slots 400a and 400b are defined by a pair of opposing ends 402a and 402b, respectively.

In one non-limiting embodiment, two slots 400a and 400b form. Though, in alternative embodiments, more slots may also be used. The slots 400a and 400b are sized and dimensioned to receive the pins 302a and 302b that extend from the upper face of the module plate 120. In this manner, the saw plate 128 is adapted to rotate in two directions until the pins 302a and 302b engage one of the ends 402a and 402b of the elongated slots 400a and 400b, respectively.

The saw plate 128 comprises an internal mesh 404. The saw assembly 126 may also include one or more gears 134a, 134b operatively joined with the internal mesh 404 of the saw plate 128, whereby the saw plate 128 and the gears 134a and 134b rotate in opposite directions.

The saw assembly 126 may also include one or more rods 130a and 130b extending through the rod holes 200a and 200b, 300a and 300b in the drill plate 112 and the module plate 120.

The rods 130a and 130b are defined by a top end 132a and a bottom end 132b, respectively. The top end 132a of the rods 130a and 130b are operatively joined with the gears 134a and 134b, such that the rods 130a and 130b rotate in conjunction with the gears 134a and 134b. In some embodiments, the rods 130a and 130b rotate about a pivot axis 312. The pivot axis 312 is disposed in a spaced-apart, parallel relationship with the longitudinal axis 208.

The saw assembly 126 may also include a pair of saws 136a, 136b comprising multiple saw cutting teeth 138 and a tip 140. The saws 136a and 136b have a slightly curved shape that partially wraps around the longitudinal of the bone.

The saws 136a and 136b join with the bottom end 132b of the rods 130a and 130b. In one possible embodiment, the saws 136a and 136b join with the bottom end 132b of the rods 130a and 130b. Through this attachment, the saws 136a and 136b rotate in conjunction with the rods 130a and 130b. Thus, as the rods 130a and 130b rotate in a first direction, the saws 136a and 136b follow. This puts the saws 136a and 136b in an open position 700a with the tips of the saws distally separated, in preparation for sawing the bone.

And as the rods 130a and 130b rotate in a second direction, the saws 136a and 136b rotate in that same direction. This puts the saws 136a and 136b in a closed position 700b with the tips moving towards each other until the tips meet. This motion from the open position 700a to the closed position 700b creates a sawing, or transverse cutting motion. In some embodiments, the saws 136a and 136b rotate along a perpendicular plane 702, so as to saw the bone in a substantially horizontal manner.

In this manner, during rotation, the tip 140 of the saws 136a and 136b move distally from each other to an open position 700a. This distal motion, as above, is along the perpendicular plane 702. Thus, the rods rotate, causing the saws 136a and 136b to move away from each other until the pins 302a and 302b of the module plate 120 engage a second end 402b of the slot 400a formed in the saw plate 128. The pins and ends of slot form a catch-lock relationship in which the slot restricts further motion in the distal direction by the saws. The open position 700a is illustrated in FIG. 7A. It is possible in one embodiment that, the saws 136a and 136b, while in the open position 700a, are operable to stow in the wall pocket 202a and 202b, respectively.

Also, during rotation, the tip 140 of the saws 136a and 136b move in proximity to each other near the longitudinal axis to a closed position 700b. For example, FIG. 7B shows the closed position 700b of the saws 136a and 136b. The saws 136a and 136b move towards each other until the pins 302a and 302b of the module plate 120 engage a first end 402a of the slots 400a formed in the saw plate 128. The pins and ends of slot form a catch-lock relationship in which the slot restricts further motion in the proximal direction by the saws.

In sawing, or cutting operation, the saws 136a and 136b spin around the bone 900 and simultaneously cut across the bone 900 between them until the saw tips 140 finally meet at the center; and the pins 302a and 302b reach the first end 402a of the slots 400a and 400b, or closed position 700b for the saws (See FIG. 7B). After cutting the bone the desired dimensions, the operator stops the motor of the power drill 1300, and visually checks to confirm that, indeed, the pin has reached the first end 402a of the slots 400a and 400b. This indicates that a portion of bone is now separated and ready to be harvested Turning now to FIG. 8A, the device 100 further comprises a spring 500 that extends between the stabilizing module assembly 118 and the saw assembly 126. In one non-limiting embodiment, the spring 500 extends between the module shank 122 of the stabilizing module assembly 118 and the saw plate 128 of the saw assembly 126. However, the spring 500 may also join with other sections and components of the module assembly 118 and the saw assembly 126.

In FIG. 8A, the spring 500 is shown stretched and additional tension applied to the spring, due to rotation of the saw plate 128. This causes the saws to move to the open position 700a in preparation for a transverse cutting motion, or in some embodiments, stowage in the wall pockets 202a and 202b. This correlates to the position of the saws in FIG. 7A. The saw plate 128 is manually rotated in one direction until the pins 302a, 302b engage the second end 402b of the elongated slots 400a and 400b, and saws are set into their open position 700a. This restricts further rotation, as the open position 700a of the saws is limited by the pins 302a and 302b.

However, FIG. 8B shows the spring 500 biased in the natural position, causing the saw plate 128 to rotate towards the closed position 700b, where the tips of the saws 136a and 136b are in proximity, or completely engaged. Thus, the tension in the spring 500 pulls the saw plate until the pins 302a and 302b engage the first end 402a of slot 400a, forcing the saws to the closed position for the transverse cutting motion. This correlates to the saws shown in FIG. 7A. The saw plate 128 is manually rotated in an opposite direction until the pins 302a, 302b engage the first end 402a of the elongated slots 400a and 400b, and saws are set into their closed position 700b. This restricts further rotation, as the closed position of the saws is limited by the pins 302a and 302b.

The device 100 provides multiple advantageous for bone grafting over the prior art. Firstly, because of the fenestrated feature design of the drill shaft 114, incorporating a longitudinal guide wire channel 206 at its center to accommodate a guide wire 904 to pass through-and-through, this unprecedentedly allows for a guide wire 904 (K-Wire) to conduct the process which uniquely guides the device 100 along a preset pathway into the body to precisely 'piece meal harvest' an intact solid living bone tissue sample which in-turn can be immediately utilized for medical treatments.

It is significant to note that the exact size of the solid living bone tissue sample to be harvested is selectable. And the process of such a precise En-Bloc bone harvesting is now safely guided by a guide wire. Unwanted deviations of the device 100 from the preset pathway into lateral directions (slipping on the pelvis) to cause unwanted collateral damages is strictly limited and prevented, or forbidden. This is now a safely guided procedure for the endeavor, and for this important specific purpose, it is nonetheless unprecedented; even though guide wires 904 have long existed for other all-various purposes in surgery.

Secondly, because of the fragile nature of the pelvic bone (ilium), it is highly prone to fracturing during the harvesting process, and which is not an uncommon event. In this respect, by plunging the device 100 into the pelvis, if harvesting bone percutaneously within it/plunging inwards between the inner and outer plates of the iliac crest or potentially if extended slightly wider to include some limited portions of the external surfaces of the pelvis, outside the inner and outer plates of the iliac crest (for example, in an attempt to harvest a small Tricortical Graft); lateral deviation of the device 100 must be avoided at all times whilst the Device is in the pelvic bone to avoid undue side forces and unwanted stresses exerted.

In addition, ideally the device 100 is introduced once-only into the pelvis for all bone harvesting purposes and not to be removed and re-introduced repeatedly for additional amounts of bone if required for the Medical Treatments. Therefore it can be useful that during the operation of, for example during a Spine Reconstruction process, for an initial block of bone measured to be required during the Spine Reconstruction the device 100 can be entered into the pelvis to harvest this known volume of bone, and is firstly sectioned within the device 100, which remains seated and plunged within the pelvis. But later the surgeon decides that an additional block of bone is further required to complete the Spine Reconstruction. Or if additional bone chips are required, for which a second block of bone can simultaneously be also harvested and readily milled/crushed to bone chips particulates, either using a rongeur forceps or a bone crusher, or a bone mill.

In operation, the device 100 is ideal for harvesting bone graft for augmenting and reconstructing diseased bones. As illustrated in FIG. 9, an initial step is that a guide wire 904 is driven into the bone 900 through the skin 902. In one non-limiting embodiment, the guide wire has a diameter of 1.5 mm; but any suitable size and dimension may be used. The guide wire 904 can be driven through percutaneous wire fixation using a power or hand drill which marks the exact harvesting site (exact position) in the body. This position is typically at the top of the iliac crest of the pelvis, where the bone harvesting is to be conducted. The guide wire 904 is also inserted in the suitable direction for a correct pathway inwards.

Turning now to FIG. 10, an incision 1000 is made through the skin 902 (and down to the bone) along the top of the iliac crest of equal length on either side of the guide wire which was previously inserted, and the total length of the incision marginally exceeds the diameter of the longitudinal drill assembly 102 in order to accommodate its subsequent entry through the skin and into the body, and to allow additional space for placement of a standard soft tissue retractor which holds back the soft tissues during the harvesting process.

As shown in FIG. 11, the soft tissues is reflected on either side of the incision 1000 with the use of any standard instruments, such as periosteal elevators. These medical instruments enable opening up the incision and allowing access entry for the device 100. As soon as the underlying bone 900 is exposed, a soft tissue retractor 1200 is placed in the site and positioned to hold back the soft tissues, and exposing the underlying bone. In one non-limiting embodiment, a trocar funnel (360 retractor) can be used (See FIG. 12).

Looking now at FIG. 13, the guide wire 904 is inserted, the soft tissues reflected, and the retractor 1200 is held into position. Thus, the underlying bone 900 is exposed, such that the device 100 can be introduced. At default (factory-set), the module assembly 118 is parked/fixated right at the top of the drill shaft 114 (out of harm's way) via the fastening mechanism 142 and set at 0.00 mm as according to the depth gauge 116 at the drill shaft 114.

At this top position, the spring-loaded saws 136a and 136b are naturally in the closed position 700b whereby their tips meet at the center. And the saws exist at the upper section 106a of the drill wall 104, and in contact with the drill plate 112. With the saws 136a and 136b 'parked' in this "safely out of the way position", the device 100 can firstly be used as like any normal hollow drill (trephine drill) to just perform the longitudinal cutting downwards into the bone. In other embodiments, a primary plunge-cut may also be performed. It is also significant to note that a secondary cutting could be referred to as the subsequent across-cutting, horizontal cutting effected by the spring-loaded saws 136a and 136b.

A power drill 1300 may then operatively attach to the top end of the drill shaft 114, so as to actuate rotation thereof. In some embodiments, the power drill 1300 comprises a motor that bears a built-in fenestration at its center, or a longitudinal central tunnel, that accommodates/allows internal passage for the guide wire 904 to pass through. The device 100 is placed over the top end of the guide wire 904 which threads through-and-through. The guide wire channel 206 of the drill shaft 114 receives the guide wire 904 within its longitudinal axis right at its center, and is now positioned within the retractor and the longitudinal cutting member of the longitudinal drill assembly 102, resting on top, and in contact with the underlying bone 900.

Looking at FIG. 14, the operator starts the motor of the power drill 1300, which causes the drill cutting teeth 110a and 110n of the longitudinal drill assembly 102 to rotate and drill the bone 900 in the standard clockwise direction. The longitudinal drill assembly 102 is now driven down into the pelvis bone to reach a suitable depth. In alternative embodiments, a second set of millimeter markings on a second depth gauge 116 may be provided on the outside of the drill wall 104, so as to indicate the depth drilled by the longitudinal drill assembly 102. When the desired depth is reached, the operator stops the motor, and pulls-out/withdraws the guide wire 904, which is easily and readily taken out of the pelvis via the guide wire channel 206 of the drill shaft 114.

Looking now at FIG. 15, the operator now unscrews the fastening mechanism 142 to release the module assembly 118 from the fixed position relative to the drill shaft 114. This release allows the saw plate 128 to rotate clockwise, which moves the saws 136a and 136b to the open position 700a. While withholding the saw plate 128, and keeping the saws in the open position 700a, the operator slides the module assembly 118 downwards along the drill shaft 114 to a suitable depth position, as indicated by the millimeter marking on the depth gauge 116. In one exemplary use, this may be a depth of about 8 mm.

Next, the module assembly 118 is released, and the fastening mechanism 142 tightens to secure the module assembly 118 and saw assembly 126 to the drill shaft 114. This remains the height during cutting and sawing operations. The tips 140 of the saws 136a and 136b do not engage (meet) because of the bone 900 between them. Consequently, the tips of the saw, effectively 'clip' together tightly against the both sides of the bone, on opposite sides.

As FIG. 16 illustrates, the operator starts the motor for the power drill 1300 again, resuming it, but does not exert any downward pressure on the device 100. This allows the instrument to operate independently of the operator. The saws 136a and 136b are now in-effect spinning around the bone 900 and simultaneously cutting across the bone 900 between them until the saw tips 140 finally meet at the center; and the pins 302a and 302b reach the first end 402a of the slots 400a and 400b, or closed position 700b for the saws (See FIG. 7B).

Looking now at FIG. 17, the operator stops the motor of the power drill 1300, and visually checks to confirm that, indeed, the pin has reached the first end 402a of the slots 400a and 400b. This indicates that a portion of bone is now separated and ready to be harvested. If the surgeon confirms at this point that no additional bone is required, the harvested bone 1700 is collected, and the saws 136a and 136b are moved to the open position 700a for cleaning, stowage, etc.

As FIG. 18 illustrates, the operator can remove the entire device 100 out of the pelvis and delivers the harvested bone 1700. Further, the retractor and ready to suture the soft tissues to close the wound). The operator simply withdraw the device 100 out of the pelvis, turns the saw plate 128 clockwise to open the saws to the open position 700a, where the pins 302a and 302b reach the second end 402b of the slots 400a and 400b. Finally, the harvested block of bone drops out of the drill wall 104 from the longitudinal drill assembly 102. A stitch 1800 may be used to close the incision. A hollow section of bone 1802 may also form where the harvested bone was removed. In any case, the device 100 is removed and completed with the medical procedure for harvesting bone graft for augmenting and reconstructing diseased bones.

Looking now at FIGS. 19A-19C, the device can be adjusted to correct for incomplete, or inaccurate drilling of the bone. If for example, the longitudinal drill assembly 102, and specifically the drill cutting teeth 110a and 110n, have not been fully-drilled downwards/not fully-plunged into the pelvis in all its entirety, and some reserved lengths of the longitudinal drill assembly 102 remains unexhausted, the surgeon can simply reset the longitudinal drill assembly 102 for further down drilling (FIG. 19C). This is performed by rotating the saw plate 128 clockwise, causing the pin to move to the second end 402b of the slots 400a and 400b (position B). Next, the saw assembly 126 and module assembly 118 can be raised to the top of the drill shaft, at 0.00 mm on the depth gauge 116. The saw plate 128 is then released, such that the saws close harmlessly high above the pelvis. This height is secured with the fastening mechanism 142. Then, plunge-cutting occurs for more down drilling to utilize the entire length of the Device into the pelvis.

As shown in FIG. 19B, after reaching this maximum depth, the surgeon then releases the fastening mechanism 142 and moves the saw assembly 126 and module assembly 118 downwardly, deeper below and beyond the vertical level where the first bone section was made. The saw assembly 126 and module assembly 118 is then repositioned to a suitable depth for additional bone harvesting. The operator may then rotate the saw plate clockwise in order to move the saw assembly 126 and module assembly 118 downwards to a suitable depth position. From that point, referencing the millimeter marking on the depth gauge, the operator releases the saw plate, which suddenly springs anticlockwise due to the spring 500, which effectively clips the bone between the saws firmly.

Continuing with the process, the saw assembly 126 and module assembly 118 are firmly fixed at that chosen depth point along the gauge, and ready to proceed. This fixed depth is shown in FIG. 19C. At that depth, the operator re-tightens the saw assembly 126 and module assembly 118 with the fastening mechanism 142. The motor for the power drill is then resumed which resumes the motor for the Saws to section the bone at that depth point. After the final/second sectioning is completed, as indicated by the pin which reaches the first end of the slot (position A). This is visible to the surgeon, and the surgeon can be satisfied that both the initial bone required, and also the additional bone are both captured inside the device 100. Next, the surgeon removes the whole device out of the pelvis and all both bone pieces are harvested simultaneously, safely and both are ready for reconstruction uses.

It is significant to note that this is an alternative embodiment, or novelty feature. This is because, even after the first across-cutting bone sectioning by the saws, and ready for harvesting. However, if the surgeon decides additional bone is required, the device 100 can be reset to 0.00 mm and positioned to drill deeper down to harvest/collect more bone before finally withdrawing the device 100 and to harvest additional bone without causing great disturbances to the pelvis and surrounding tissues. This is superior to taking out the device 100, and then to introduce a second device and a second plunge-cut downwards causing greater trauma, stress and risks of fracturing the delicate pelvis.

However, in other embodiments, two sections of bone can be harvested, if the first amount of harvested bone was insufficient. If, for example, the bone was initially sectioned at the 5.0 mm depth, the saws meet at the center and pin was in the first end of the slot (position A), and the device still remained inside the pelvis. However, if additional amounts of bone were subsequently required, the surgeon can simply unscrew/release the fastening mechanism 142, rotate the saw plate 128 clockwise and reposition the saw assembly 126 and module assembly 118 further down the drill shaft 114, about 8.0 mm, for example (See FIG. 20A).

Next, the saw plate is released to allow the saws clip the bone between them at that point and to fixate the new depth position. The fastening mechanism 142 may then secure the depth, and the power drill can begin sawing the bone at that depth. After the final/second sectioning is completed, as indicated by the pin which reaches the first end of the slot (position A). The surgeon views the cut and is satisfied that both the initial bone which was captured at 5.0 mm depth. And as FIG. 20B shows, the additional bone (at 8.0 mm depth) is also captured inside the cavity of the drill wall 104 of the longitudinal drill assembly 102. The surgeon may then remove the device out of the pelvis and all both bone pieces are harvested simultaneously to be used as needed.

This novel feature allows the surgeon to conservatively titrate the exact amounts of bone required to be harvested during the operation procedure, providing flexibility. This is important because sometimes the surgeon might need a little more bone than calculated pre-operatively from the X-Rays and diagnostic approximations. Over-estimation and harvesting too much bone amounts than necessary, on the other hand, causes more trauma or damage to the pelvis and bone will be wasted. Thus, as shown in FIG. 21, two or more bone blocks 2100a, 2100b can be harvested as necessary without yet removing the device from the pelvis from a single device 100. This avoids additional visits/attempts by secondary instrumentations and repeat harvesting traumas and disturbances. This is repeated until the surgeon confirms that it is enough, and the total bone required is harvested in one drilling and withdraw process.

In additional embodiments, shown in FIGS. 22-32B, the device 100 and method perform autograft in a spinal surgery and other orthopedic surgeries either as bone chips (morselized graft) or as a tricortical live implant (tricortical graft) in order to improve the immediate strength of the construct.

FIG. 22 references a cross-sectional view of the pelvis (Iliac Crest). As shown, the guide wire 904 is driven through the soft tissues 2204 and into the pelvis, approaching from the top of the crest. The Iliac Crest is thin in cross-section. Therefore, the position and direction of the insertion must be centered, all to be within the very midst of the structure. The guide wire 904 is essential because it pre-sets a correct pathway for guiding the device downwards into the pelvic bone. This, so that it does not unintentionally deviate sideways and perforate right out of the pelvis, through either inner or outer sides of the pelvis bone during the downward plunge-cut, and cause excessive damages, or to perforate into the intestines. This is the key feature of the guide wire 904.

It is also known in the art that the outer layer portion (cortex) of the Pelvis Bone (Iliac Crest Native Bone) is a hard crust of Cortical Bone 2200 which is very strong living structure with fewer bone cells, and this contains the inner portion (medulla) is less hard/softer Cancellous Bone 2202 which is also hard, but comparatively not as strong, but contains a rich supply of living bone cells, and vital properties for healing.

Looking now at FIG. 23, the relatively narrow diameter of the device, less than the width of the pelvis, allows the longitudinal drill assembly 102 to enter the top of the Iliac Crest and fall within both side surfaces, or both side cortical plates 2306 (inner cortical wall and outer cortical wall) of the Pelvic Bone. In essence, the longitudinal drill assembly 102 can be driven into the pelvis 'percutaneously', falling within the boundaries of the bone structure 2304. This is a good harvesting approach and it is conservative. However, this can harvest only a cylindrical unicortical bone block 2300, which means, only the top surface contains the crust (1-cortical hard layer), and is referred to as a unicortical graft 2302. It is significant to note that a unicortical graft 2302 can be useful in many instances. For example, the unicortical graft 2302 can be used as a unicortical live implant when strength is not over-demanded, or else it can be reinforced by additional instrumentation (plates and screws) for added strength to meet the demand. In order to provide strength to be able to support the body weight, if this bone graft was placed on its side and inserted into the spine it may not be strong enough, because the rest of it (cancellous bone) might collapse under the weight; so we will need more cortical bone layer on the edge of the bone block.

Turning now to FIG. 24, if the diameter of the device is increased slightly, to slightly exceed the width of the pelvis, the device now enters the top of the Iliac Crest and can also include both side surfaces, or both side cortical plates (inner cortical wall and outer cortical wall) of the Pelvic Bone 2402, in essence, to harvest a cylindrical tri-cortical bone block 2400, which consists of 3-cortical hard crust layer, top surface and both side surfaces, and also within which contains the cancellous bone. FIG. 25 illustrates how a limited clinically relevant portion of the Iliac Crest is removed, it includes all three cortical surfaces, to result in successfully harvesting an essential Tricortical Bone Block 2500, used for the good intention of healing the spine, or other parts of the skeleton, but yet involving minimal disturbances to the Iliacus Muscle 2502 and the Psoas Major Muscle 2504.

Continuing with additional embodiments, FIG. 26A references how the device 100 with a suitably larger diameter than the width of the pelvis can be utilized to firstly harvest a Tricortical Bone Block 2500, which is still cylindrical in shape. FIG. 26B shows the top view of the cylindrical Tricortical Bone Block 2500 and how it is next sectioned/cut on either sides, to finally produce a middle portion 2600, which is flat, and contains three outer surfaces of cortical bone 2602, 2604, which now becomes a textbook Tricortical Graft (the Smith-Robinson, or, the C-Type Graft) which is suitable and usable for insertion into the spine.

FIG. 27 illustrates the middle portion sectioning/cutting of the cylindrical tricortical bone block 2702, which results in a tricortical graft 2700. FIG. 27 illustrates a perspective view of the middle portion sectioning/cutting of the cylindrical tricortical bone block, and in scientific terms, it is exactly this middle portion which suddenly becomes the 'textbook' clinically applicable 'Tricortical Bone Graft' or C-Type Autograft (or the Smith-Robinson Horse-Shoe Shaped Disc) which is immediately suitable to be inserted into the Spine Disc Spaces and/or commonly used to repair other parts of the skeleton. This is referred to as a graft because it can now be used as an official proper bone graft unit, i.e. as a tricortical live implant for grafting purposes, for repairing the spine defects and/or other skeleton defects. This is commonly known as the C-Type graft because of the three outside harder cortical layer surfaces surrounding the inner medullary portion of softer cancellous bone, and is commonly the most-preferred and used.

As shown in FIG. 28A, the unicortical bone block or the tri-cortical bone block can be readily converted into bone chips, or bone fragments 2800; also known as morselized grafts. This bone conversion is possible with a Rongeur forceps 2804 for crushing bone. And as FIG. 28B illustrates, these can be morselized manually with a Rongeur forceps 2804. Or a mallet 2802 can be placed in a bone miller 2806 to provide a more consistent substrate for grafting. The bone miller 2806 may include a clamp which is screwed onto the bone within a chamber, and crushes the bone block into chips, or fragments (and thus into morselized bone grafts).

In another bone harvesting example, FIG. 29 references the use of a standard motorized round burr 2900 to remove the old degenerated Spine Disc from the Disc Space in the spine and also to suitably prepare the surfaces of the adjacent vertebrae (end plates) above and below the Spine Space in order to receive the Tricortical Bone Graft 2902 harvested from the Iliac Crest 2904. FIG. 30 illustrates the Tricortical Bone Graft 2902 harvested from the Iliac Crest has been inserted into the spine space.

Continuing, the Tricortical Bone Graft 2902 harvested from the Iliac Crest is inserted into the spine space, along with additional amounts of Bone Chips or bone fragments, or Morselized Bone Grafts 2800. These bone chips are added into the spine space behind and around the Tricortical Bone Graft (See FIG. 31A). FIG. 31A shows a side sectioned side view of the spine with the harvested Tricortical Bone Graft inserted into the spine space and the remaining spine space is filled with additional bone chips (Morselized Bone Grafts), and FIG. 31B shows a front sectioned side view of the spine with the harvested Tricortical Bone Graft inserted into the spine space and the remaining spine space is filled with additional bone chips (Morselized Bone Grafts). In this example, there are two Tricortical Bone Grafts placed into the spine space. A cross-section view of the spine space shows how two Tricortical Bone Grafts are placed side-by-side next to each other; and then behind, between and around these two Tricortical Bone Grafts are placed additional Morselized Bone Grafts which are evenly distributed to increase the total volume of Bone Grafts with the aim to fully fill-in the remaining residual portions of the spine space.

FIG. 32A shows a top view of the spine space, with two Tricortical Bone Grafts 3200a, 3200b placed into it. And FIG. 32B shows a top view of the spine space, and this time, with two titanium cages 3202a, 3202b packed into it. The titanium cages 3202a and 3202b are commercial products and are simply empty hard-shell containers to try to mimic/simulate the cortical bone hard layer of the Tricortical Bone Graft, improvising it and copying the same size/shape.

It is significant to note that the titanium cages 3202a and 3202b themselves do not provide any fusion or healing of the spine. The morselized bone grafts 3204 are packed into the titanium cages 3202a and 3202b, because the morselized bone grafts 3204 are loose bone chips, powder bone with no strength, and so requires a cage, or cassette, to be consolidated/to be collectively contained, and piece-meal-inserted into the spine space. In addition, more morselized bone grafts 3204 can be also added between the titanium cages 3202a and 3202b and around the spine space, for synergy to potentiate the spinal fusion to occur.

The device 100 is also efficacious for treating nonunion fractures of the bone. Those skilled in the art will recognize that approximately 7.9 million patients sustain fractures in the United States annually, and up to 10% go on to have impaired bone healing resulting in a delayed union or a nonunion. As the populations of developed countries age, the incidence of fractures, including non-union bone fractures, will continue to increase.

Every fracture carries the risk of failing to heal and resulting in a nonunion. While nonunions can occur in any bone, they are most common in the tibia, humerus, talus, and fifth metatarsal bone. FIGS. 33A-33E reference the various example types of nonunion fractures which occur. FIG. 33A shows a hypertrophic nonunion fracture 3300a. FIG. 33B shows an oligotrophic nonunion fracture 3300b. FIG. 33C shows an atrophic nonunion fracture 3300c. FIG. 33D shows a necrotic nonunion fracture 3300d. FIG. 33E shows a defect nonunion fracture 3300e.

Several factors contribute to a nonunion. If the bone ends that are fractured have been stripped away from the blood vessels that provide them with nutrition, they will die. As a result, the bone ends cannot contribute to new healing, and a nonunion is more likely. Without a good blood supply and growth of new blood vessels, no new bone will form and the fracture cannot readily heal. Nonunion is permanent failure of healing following a broken bone unless intervention, such as surgery is performed. A fracture with nonunion generally forms a structural resemblance to a fibrous joint, and is therefore often called a "false joint" or pseudoarthrosis. Nonunion is a serious complication of a fracture and may occur when the fracture moves too much, has a poor blood supply or gets infected. The normal process of bone healing is interrupted or stalled.

It is also known that surgical treatment options for the nonunion fractures include: 1) Removal of all scar tissue from between the fracture fragments; 2) Immobilization of the fracture with internal or external fixation. Metal plates, pins, screws, and rods, that are screwed or driven into a bone, are used to stabilize the broken bone fragments; and 3) Bone grafting.

In regards to bone grafting, donor bone or autologous bone (harvested from the same person undergoing the surgery) is used as a stimulus to bone healing. The presence of the bone is thought to cause stem cells in the circulation and marrow to form cartilage, which then turns to bone, instead of a fibrous scar that forms to heal all other tissues of the body. Bone is the only tissue that can heal without a fibrous scar. Autologous bone graft is the "gold standard" treatment of the nonunion, and the autologous bone graft is obtained from the iliac crest. Autologous bone grafting appears to represent the bone grafting modality of choice with regard to safety and efficiency in the surgical management of long bone fracture nonunions.

FIGS. 34A-34B illustrate the repair of nonunion fracture using Morselized Bone Grafts 3400 harvested from the Iliac Crest, and packed into the fracture site of the long bone, and the fractured bone is fixated/stabilized with plate and screws 3402. FIG. 34A illustrates the repair of a Humerus (upper arm). FIG. 34B illustrates the repair of a Clavicle (shoulder bone). Plate and Screws. Furthermore, FIG. 35 illustrates a side view of the fracture repair using plate and screws 3500 and Morselized Bone Grafts 3502 harvested from the Iliac Crest is packed into the fracture site.

In FIG. 36, the repair is to a typical metatarsal bone presenting a nonunion fracture. Bone grafting is a common procedure in foot and ankle surgery. Commonly, autologous bone graft has most often been harvested from the iliac crest. Despite the increasing availability of allograft bone and bone graft substitute products, autologous (autogenous) bone graft is used most frequently for surgery of the foot and ankle. Fresh autologous bone has osteoconductive and osteogenic properties. Further, autologous grafts circumvent infectious and immunologic complications, and there is evidence that it they are incorporated more consistently than allograft. In foot and ankle surgery, the most frequent indications for the use of bone graft include arthrodesis and repair of non-union or fracture. Iliac crest has been the most commonly used donor site for orthopedic procedures.

FIG. 36 shows the repair of nonunion fracture using Morselized Bone Grafts 3600 harvested from the Iliac Crest, and packed into the fracture site of the foot, and the fractured bone is externally fixated/stabilized with plate and screws 3602. Numerous arthrodesis techniques (surgical immobilization of a joint by fusion of the bones) for the ankle have been described. These techniques can be divided into two main categories: those that use external fixation and those that use internal fixation. The surgical approaches and fusion techniques have tended to become simpler with time. One reason has been that in general, an ankle arthrodesis with internal fixation using internal cross-screws has fewer complications and is better tolerated than one using external fixation techniques using external plates and screws.

In contrast to the external fixation using plates and screws, internal cross-screws can be inserted with minimal soft-tissue trauma. The cross-screw technique has gained popularity because of its simplicity, and using a cylindrical graft technique, such as a uni-cortical bone block harvested from the Iliac Crest, in which the cylindrical graft was positioned in the coronal plane. This technique does not use hardware such as plates, and the cylindrical graft itself is used to stabilize the fusion. It has the advantage of being a simple and rapid method, with minimal soft-tissue dissection.

In practice, bone healing was reportedly achieved in 58 out of 62 patients. A modified cylindrical graft technique in which the cylindrical graft was positioned in the sagittal plane at the midpoint of the joint. The fusion was stabilized by cross-screws. It was reportedly a very successful technique with union (i.e. bone unity) achieved in 19 out of 20 patients, with few complications. To further improve the initial stability, a technique was developed for arthrodesis in which two cross-screws were used, and a cylindrical graft is positioned in a diagonal plane from the anteromedial side of the joint towards the lateral malleolus.

FIGS. 37A-37B illustrates the bone fusion of the ankle and heel bone, using a cylindrical graft, unicortical bone block 3700 harvested from the Iliac Crest, and two internal cross-screws 3702a, 3702b for the fixation. This shows the cylindrical graft positioned in the diagonal plane and rotated 90°. The medial screw 3704 is placed posterior to the cylindrical graft and the lateral screw anterior relative thereto.

FIG. 38 shows how the device 100 can be used to harvest a Unicortical Bone Block 3800 from the top of the pelvis by directly drawing it out via only a small incision through the soft tissues. This can also harvest additional segment of bone material if required before being finally removed from the pelvis. The additional bone block 3802 can also be crushed into morselized bone grafts 3804, harvest of bone if required.

FIG. 39 shows how the device 100 can be used to harvest a Tricortical Bone Block 3900 from the top of the pelvis by directly drawing it out via only a small incision through the soft tissues, and which can be trimmed for the middle portion which is essentially a Tricortical Bone Graft which is known as the C-Type Graft and is commonly used. And it can also harvest additional segment of bone material 3902 if required before being finally removed from the pelvis; the additional bone block can be optionally crushed into morselized bone grafts 3904.

FIGS. 40A-40C references the three common techniques, or shapes of the Bone Block suitable for grafting for spinal fusion. FIG. 40A illustrates a Robinson and Smith—Tricortical Iliac Crest Autograft 4000. FIG. 40B shows a Cloward—Circular Cylindrical Autograft 4002. FIG. 40C references Bailey and Badgley—Slot Graft or Trough-Type Autograft 4004. However, in other embodiments, the device 100 can operate with other spinal fusion techniques.

A method 4100 for autologous bone graft harvesting is referenced in flowchart shown in FIG. 41. The method 4100 is utilized in bone grafting surgery. The method 4100 is referenced in flowchart shown in FIG. 41, and includes an initial Step 4102 of providing a bone graft harvesting device, the device comprising a longitudinal drill assembly, a module assembly, and a saw assembly. Initially, the guide wire 904 of a suitable length and diameter is used.

Next, the guide wire 904 is driven into the bone through the skin (percutaneous wire fixation) using a power or hand drill. This marks the spot, or a suitable centered area of interest of the body for the harvesting to take place via the device 100. And also, the guide wire 904 can be used to concisely guide our device down/inwards assertively in the correct direction and pathway angle into the body and avoid the device from slipping sideways which can cause collateral damages to surrounding tissues, and all lateral/sideways movements of the Device are inhibited.

The method 4100 may further comprise a Step 4104 of driving a guide wire into a bone, through the skin. A Step 4106 includes cutting an incision through the skin. At the entry point where the guide wire 904 is driven into the bone through the skin for a percutaneous wire fixation, an incision of suitable length is made through the skin which includes the point of entry by the guide wire 904, and of equal length on either side of this point of entry. The total length of the incision corresponds closely to the diameter of the Main Drill Body, to allow the Main Drill Body to pass through the skin, or made slightly larger to allow space for the soft tissue retractor(s). After the guide wire 904 insertion and the skin incision, standard retractors are used to retract the soft tissues apart on either side of the incision and to expose the top surface of the underlying bone (the pelvis, or more specifically, the iliac crest of the iliac bone/ilium).

In some embodiments, a Step 4108 comprises introducing the guide wire through a longitudinal guide wire channel that forms through a drill shaft of the longitudinal drill assembly. A Step 4110 includes attaching a power drill to the top of the longitudinal drill assembly, so as to rotate the drill cutting teeth about the section of bone. In some embodiments, a Step 4112 may include loosening, with the fastening mechanism, the fixed relationship between the module assembly and a drill shaft of the longitudinal drill assembly. A Step 4114 comprises adjusting the module assembly and the saw assembly to a desired height relative to the drill shaft of the longitudinal drill assembly.

The method 4100 may further comprise a Step 4116 of powering on the power drill, whereby the drill cutting teeth cut into the bone. The diameter of the drill wall for the longitudinal drill assembly 102 (Trephine), sets a horizontal limit to the body invasion, strictly limiting the horizontal extent of damage (to only as required). Also, the drill plate sets a vertical limit and prevents the drill wall for the longitudinal drill assembly 102 to drill deeper/invade any deeper into the body than the preset length of the device 100. Thus, is minimally invasive surgery. A Step 4118 includes releasing the spring-loaded saws of the saw assembly to cut transversely across the bone. Both spring-loaded saws cross towards each other to slice through the bone. A Step 4120 comprises visually confirming the bone is separated by viewing a pin on the module assembly has engaged a first end of a depression in the saw assembly. Another Step 4122 includes removing the cut bone section from the cavity of the drill wall for the longitudinal drill assembly. A cross section of bone, possibly disc-shaped is then available for further medical procedures therewith.

However, after the Step 4118 of cutting transversely across the bone, and the Step 4122 of removing the cut bone cross section from the cavity of the drill wall, the operator may continue to saw additional cross sections of bone, so as to harvest another cross section. In essence, a Step 4124 involves cutting, transversely with the spring-loaded saws, at least one additional bone section, while the saw assembly remains in the entry point. This can involve urging the device further into the entry point, so as to cut a lower cross section of bone. This repeat harvesting enables the operation to continue, without pulling the bone graft harvesting device 100 out of the bone in one operation.

In other words, it is not required to extract the longitudinal drill assembly from the incision. This is advantageous since repeat egress and ingress through the entry point can increase the chances of infection. Also, the standard retractors, used to retract the soft tissues apart on either side of the incision and to expose the top surface of the underlying bone, do not have to be repeatedly utilized to access multiple cross section of bones from the same entry point.

In one exemplary application of Step 4124, the operator initially cuts 2 mm into the bone with the longitudinal drill assembly, in the process discussed above. After sawing across the bone, the operator collects a 2 mm disk of bone in the process. And then without pulling the device out of the bone to retrieve the 2 mm piece, the operator continues to cut a further 3 mm into the bone and harvest a 3 mm disk of bone. And Step 4124 can be repeated multiple times with the operator cutting an additional 4 mm into the bone to harvest a 4 mm disk of bone.

In this manner, the operator harvests three cross sections of bone in one entry through the incision. This saves the wear and tear of continuously pulling the device in and out of the incision. And multiple cross sections of bone, and of varying thicknesses and at different elevations of the bone may be more efficiently harvested.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

As for the device 100, foremost it is basically a bone drill, and as like common orthopedic drills, its drill shaft 114 is also to be connected to and driven into the bone using a powered or motorized drill, in the typical fashion in a clockwise direction. However, in this case, along the drill shaft (up-and-down) exists a moveable/mobile combined-unit of the saw assembly 126 and the module assembly 118 of assembled components (contraption), as separate/single entity that consists of a module assembly 118, a saw assembly 126, wheels, rods, and saws.

In this manner, the saw assembly 126 and the module assembly 118 are height-adjusted and fixed relative to the drill shaft 114 at any point along its length (up and down) by a fastening mechanism 142 between the module assembly 118 and the saw assembly 126 is a spring 500 extended across the top surface of the saw plate 128, to spring-load/bias the saw plate 128 to turn anti-clockwise at all times, in-effect strongly biased/tendency to move the pins into position A within the slot, and thus creates a constant/continuous force to turn both of the mechanical wheels to also rotate anti-clockwise. And effectively, the saws attached at the ends of the rods will in-turn also turn anti-clockwise towards each other until their tips of the saws meet at the center, when the pins reach the first end of the slot, or the open position 700a (position A) for the saws.

In other words, the operator can use his fingers to manually turn the Actuator clockwise to where the Module Pin reaches to position B, and if the Secure Screw Knob is released, or not tightened yet, he can hold it there and freely move the module assembly 118 and saw assembly 126 up and down to any position along the drill shaft 114; with reference from 0.00-10.00 mm of the depth gauge. If the operator releases the saw plate 128, and there is no bone inside of the device at 0.00 mm, then the saws 136a and 136b rotate anti-clockwise and turn inwardly until their tips meet at the center.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. A device for autologous bone graft harvesting, the device comprising:
    a longitudinal drill assembly having:
        a drill wall comprising an upper section and a lower section, the lower section forming an opening to a cavity, the lower section comprising a plurality of drill cutting teeth, the drill wall further forming at least one wall pocket;
        a drill plate disposed at the upper section of the drill wall, the drill plate forming one or more rod holes;
        a drill shaft extending perpendicular from the drill plate, the drill shaft defined by a flat surface, the drill shaft forming a longitudinal guide wire channel,
        the drill shaft being substantially aligned with, and rotatable about a longitudinal axis;
    a module assembly having:
        a module plate disposed above the drill plate in an adjacent, parallel relationship,
        the module plate being defined by an upper face and a lower face, the module plate forming one or more rod holes, the rod holes in the module plate being in substantial alignment with the rod holes in the drill plate;
        one or more pins extending from the upper face of the module plate; a module shank extending perpendicular from the module plate, the module shank defined by a wide upper end, a narrow lower end, whereby a shank shoulder forms between the upper and lower ends, the module shank further being defined by a module tunnel having a flat surface, the module tunnel adapted to receive the drill shaft, whereby the module assembly is operable to be displaced axially relative to the longitudinal drill assembly, whereby the flat surfaces of the drill shaft and the module shank align to at least partially restrict rotation by the module assembly relative to the longitudinal drill assembly;

a saw assembly having:

a saw plate being disposed between the module plate and the shank shoulder of the module shank in a snug relationship, the saw plate forming a central aperture sized and dimensioned to receive the drill shaft, whereby axial displacement of the saw plate relative to the module plate is at least partially restricted, whereby the saw assembly is operable to be displaced axially relative to the longitudinal drill assembly, the periphery of the saw plate forming one or more elongated slots having a pair of opposing ends, the slots adapted to receive the pins extending from the upper face of the module plate, whereby the saw plate is adapted to rotate in two directions until the pins engage one of the ends of the elongated slots, the saw plate comprising an internal mesh;

one or more gears operatively joined with the internal mesh of the saw plate, whereby the saw plate and the gears rotate in opposite directions;

one or more rods extending through the rod holes in the drill plate and the module plate, the rods being defined by a top end and a bottom end, the top end of the rods being operatively joined with the gears, whereby the rods rotate in conjunction with the gears;

a pair of saws comprising multiple saw cutting teeth and a tip, the saws joined with the saw end of the rods, whereby the saws rotate in conjunction with the rods, whereby, during rotation, the tips of the saws move distally from each other to an open position, until the pins of the module plate engage a second end of the slot formed in the saw plate, whereby, during rotation, the tips of the saws move in proximity to each other near the longitudinal axis to a closed position, until the pins of the module plate engage a first end of the slot formed in the saw plate.

2. The device of claim 1, further comprising a depth gauge disposed on the flat surface of the drill shaft.

3. The device of claim 2, wherein the depth gauge measures the position of the module assembly and the saw assembly relative to the longitudinal drill assembly.

4. The device of claim 1, further comprising a guide wire, the guide wire extending through the longitudinal guide wire channel of the drill shaft.

5. The device of claim 1, further comprising a fastening mechanism passing through the module shank, the fastening mechanism operable to help fasten the drill shaft to the inside surface of the module tunnel.

6. The device of claim 1, further comprising a spring extending between the stabilizing module assembly and the saw assembly, the spring biasing the saw plate to rotate towards the closed position.

7. The device of claim 6, wherein the spring extends between the module shank of the stabilizing module assembly and the saw plate of the saw assembly.

8. The device of claim 1, further comprising a motorized drill joined with the longitudinal drill assembly, the motorized drill rotatably driving the longitudinal drill assembly.

9. The device of claim 1, wherein the drill wall is defined by a cylindrical shape.

10. The device of claim 1, wherein the module plate and the saw plate are defined by a disc shape.

11. The device of claim 1, wherein the saws join with the saw end of the rods in a orthogonal relationship.

12. The device of claim 1, wherein the rods rotate about a pivot axis, the pivot axis being in a spaced-apart, parallel relationship with the longitudinal axis.

13. The device of claim 1, wherein the saws rotate in conjunction with the rods along a perpendicular plane.

14. The device of claim 1, wherein the saws, while in the open position, are operable to stow in the wall pocket.

* * * * *